Oct. 6, 1964  J. L. BARKER  3,152,327
AIRPORT TRAFFIC INDICATING AND CONTROL SYSTEM
Filed Aug. 4, 1959  10 Sheets-Sheet 10

INVENTOR.
JOHN L. BARKER
BY
ATTORNEY

INVENTOR.
JOHN L. BARKER
BY
Edward W. Lauer
ATTORNEY

Oct. 6, 1964　　　　J. L. BARKER　　　　3,152,327
AIRPORT TRAFFIC INDICATING AND CONTROL SYSTEM
Filed Aug. 4, 1959　　　　　　　　　　10 Sheets-Sheet 8

INVENTOR.
JOHN L. BARKER
BY
*Edward H. Parris*
ATTORNEY

INVENTOR.
JOHN L. BARKER
BY
ATTORNEY

INVENTOR.
JOHN L. BARKER

Oct. 6, 1964  J. L. BARKER  3,152,327
AIRPORT TRAFFIC INDICATING AND CONTROL SYSTEM
Filed Aug. 4, 1959  10 Sheets-Sheet 2
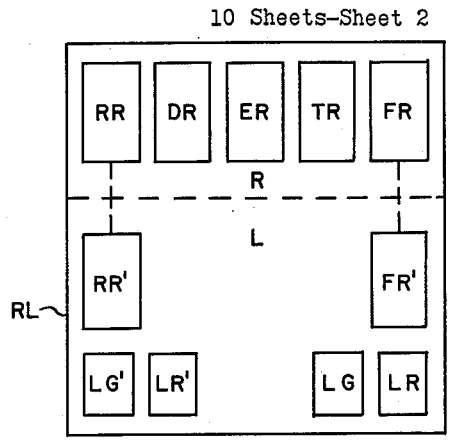
FIG. 6
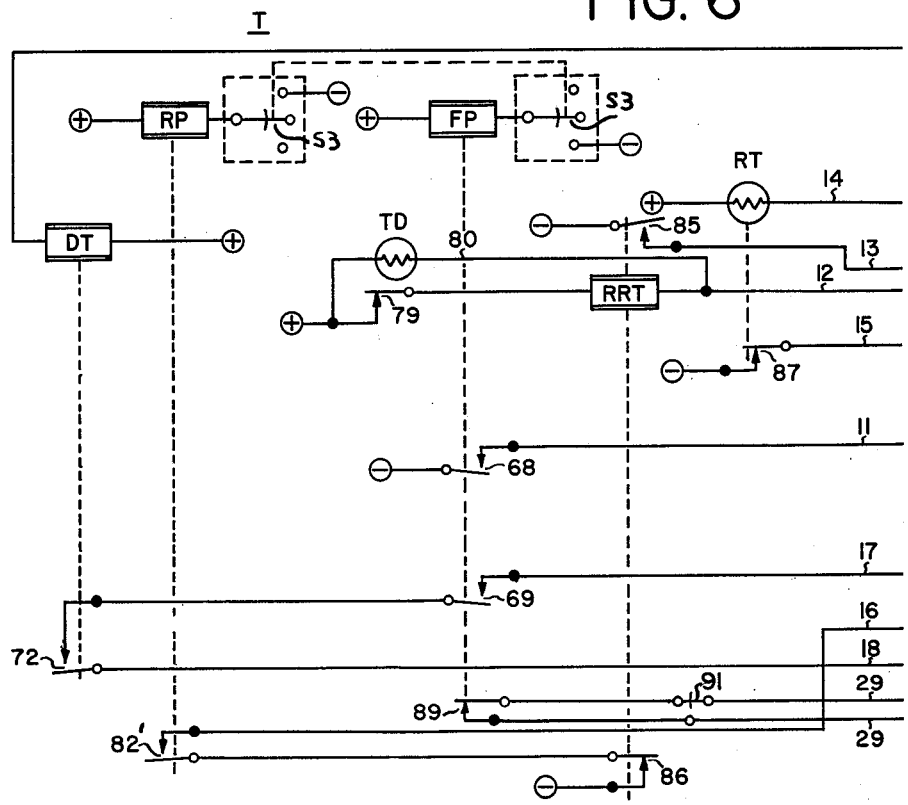
FIG. 7
FIG. 2a
INVENTOR.
JOHN L. BARKER
BY
*Edward W. Raum*
ATTORNEY Oct. 6, 1964 J. L. BARKER 3,152,327
AIRPORT TRAFFIC INDICATING AND CONTROL SYSTEM
Filed Aug. 4, 1959 10 Sheets-Sheet 1
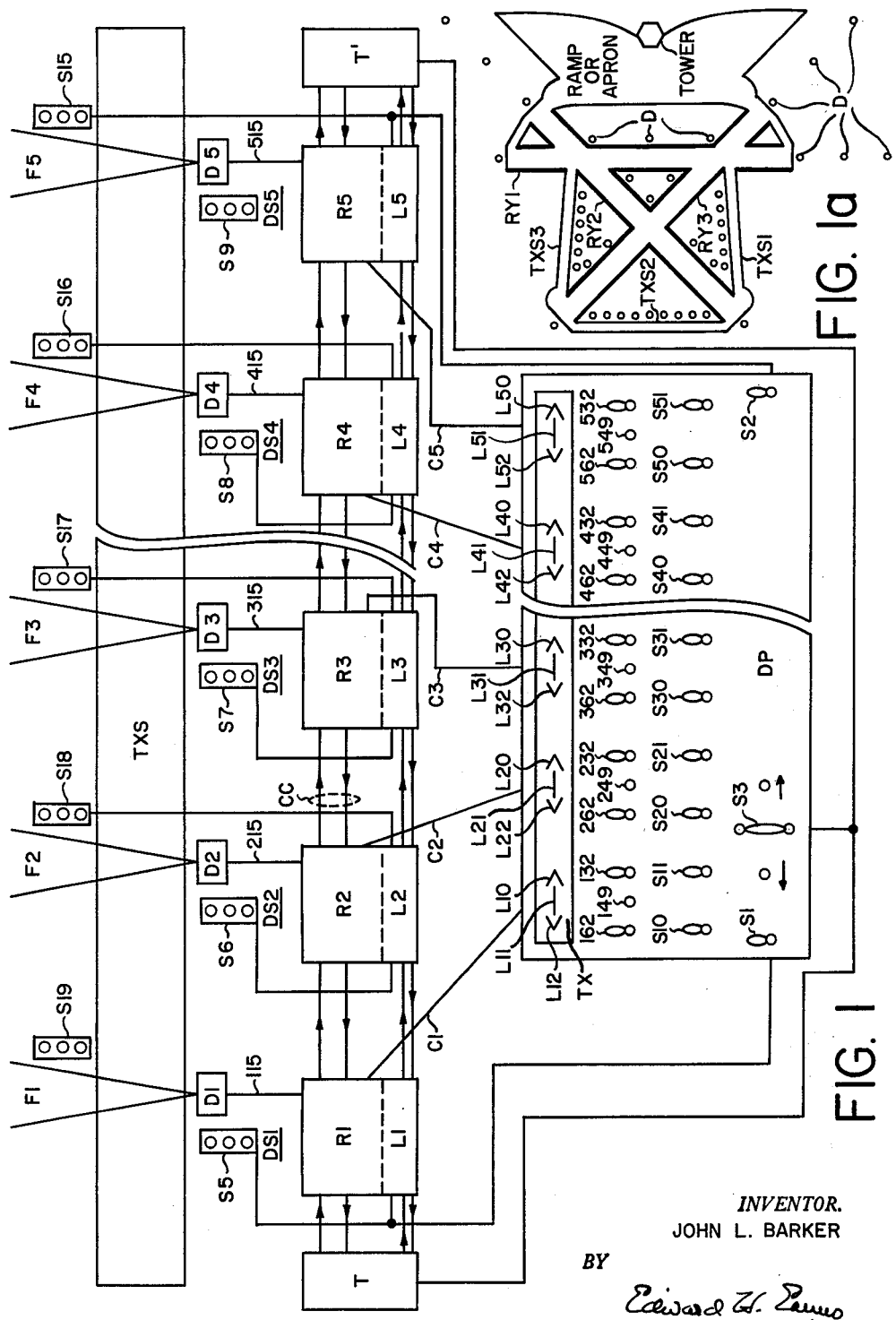
INVENTOR.
JOHN L. BARKER
BY
Edward H. Loomis
ATTORNEY

United States Patent Office 3,152,327
Patented Oct. 6, 1964

3,152,327
AIRPORT TRAFFIC INDICATING AND
CONTROL SYSTEM
John L. Barker, Norwalk, Conn., assignor, by mesne assignments, to Laboratory for Electronics, Inc., Boston, Mass., a corporation of Delaware
Filed Aug. 4, 1959, Ser. No. 831,586
19 Claims. (Cl. 343—8)

The present invention relates to a system and apparatus for tracking aircraft while the aircraft is taxiing or in the process of travel along the taxi-strip or runways at an airport or landing field, and in the approach and climb corridors associated with the runways of an airport. Associated with such tracking system and apparatus, employed as an accessory thereto, and dependent thereon, is a system and apparatus to accord control over taxiing aircraft to maintain at least a minimum distance between taxiing aircraft traveling along the same taxi-strip.

With the increase in size and speed of present day aircraft the tendency is to increase the length of the runways where this is practical. This has greatly increased the problems of visibility from the control tower where aircraft are proceeding on the runways and taxi-strips at relatively large distances from the control tower.

The present tendency in airport development and construction is to construct large airports with runways of one to two miles in length around the circumference of the airport and to centrally locate the control tower. This type of construction makes visual observation difficult especially when visability is obstructed by rain, snow, fog and haze. This makes control through visual observation extremely difficult and sometimes dependent upon radio contact with the aircraft itself.

With the increase of air traffic, particularly in the form of increasing numbers of aircraft and the difficulty in increasing the size of the present airports due to lack of real estate, increasing numbers of arriving and departing aircraft have aggravated the problem of control over such aircraft.

Aggravating the problem of control, particularly over taxiing aircraft is the need to reduce the taxiing time of an aircraft because of the relatively large fuel consumption by aircraft engines while the aircraft is on the ground operating its engine or engines.

Control of aircraft on the ground at an airport or in flight within the control area of the airport is generally under the control tower operator or dispatcher of the airport or other person or persons assigned to such task. Since aircraft taking off and aircraft landing are operating in the same general direction at the same time, it is necessary to move all outgoing aircraft from the ramp or loading area, or other area to one general focal point on the airport, the take-off end of the operating runway and to move all incoming or landing aircraft from another general area, from the slow down end of the runway used by landing aircraft to the ramp or disembarking or unloading area.

The transfer of outgoing aircraft from the ramp to the take-off focal point and the transfer of arriving aircraft from the slow down area, after landing, is accomplished by aircraft being taxied on the taxi-strips and runways.

Supervision of taxiing aircraft over the network of taxi-strips and runways becomes increasingly complicated with the increase in the number of aircraft operating from the airport.

The present invention provides a system and apparatus for automatically detecting and tracking, through aircraft actuation, taxiing aircraft on the runways and taxi-strip of an airport and for remote display of the position of such tracked aircraft relative to its position on the airport.

This is accomplished by establishing a series of detection points along the taxi-strips and runways of an airport, dividing the taxi-strips and runways into successive sections with interlocking relay circuitry between detection points producing remote indication of the position of aircraft on an indicator panel layout of the airport, in a control tower, for example.

Associated with the system and apparatus for tracking taxiing aircraft is a system and apparatus for control of minimum spacing between aircraft proceeding along the same taxiway through a system of self initiated and self actuated traffic type signals, spaced along the side of the taxi-strip and displayed to such taxiing aircraft.

From one aspect the present invention provides an interlocking block system for use at an airport for indicating the position of aircraft relative to succesive detection points, and thus in successive blocks or sections, with remote indication of the progressive movement of aircraft from section to section.

From another aspect the present invention provides a system of traffic control signals related to the several detection points for control of the minimum spacing between aircraft or their entry into the successive sections of the block system.

In accordance with further aspects of the invention sequence of actuation of successive detection points is employed to indicate direction of travel of aircraft but provision is made for proper directional indication despite omission of actuation or response to actuation of a detection point where the adjacent detection points are properly actuated.

Special indications are given of the latter condition or of entry of an aircraft at an intermediate detection point along the defined pathway without actuation of an adjacent detection point.

It is a general object of the invention to provide an improved centralized indicating and/or control system for aircraft traffic on the ground or also closely approaching or leaving the ground at an airport.

It is another object of the invention to provide a system or apparatus for automatically tracking aircraft proceeding along a predetermined path at an airport by sensing the passage of the aircraft past a series of detection points or stations along such path and indicating, on a remote display panel, the progress of the aircraft.

It is also an object of the invention to provide a system for automatically tracking aircraft proceeding along a predetermined path at an airport by detecting the passage of the aircraft by a series of spaced detection points along such path and automatically setting up progressively, on a remote display panel, successive indications of the latest detection point passed by the aircraft and the direction of travel thereof, and automatically releasing such indications as have previously been so set up for preceding such detection points by such aircraft.

Another object is to provide a system or apparatus for progressively tracking aircraft along one or more taxi-strips and/or runways and/or in the approach and climb corridors, by automatic detection of the aircraft passing a series of detector stations and to indicate the progress of travel of such tracked aircraft on a remote display panel.

A further object is to provide an aircraft actuated system or apparatus to indicate remotely the position and direction of travel of aircraft along one or more taxi-strips and/or runways and/or approach and climb corridors associated with such runway.

A still further object of the present invention is to provide an aircraft actuated signal control system which may be employed in conjunction with the tracking system or apparatus of the invention to control taxiing aircraft traffic on one or more taxi-strips and/or runways of an airport.

Another object is to provide an improved aircraft actuated tracking system including apparatus to indicate when two aircraft are approaching head-on on the same taxi-strip or runway.

A further object is to provide an aircraft actuated tracking system or apparatus capable of tracking aircraft traveling in either direction along a runway or taxi-strip and to indicate the direction of travel.

A still further object is to provide an aircraft actuated tracking system or apparatus establishing a preferential direction and indicating that an aircraft has entered upon and is traveling in the wrong direction on a runway or taxi-strip.

A still further object is to provide an aircraft actuated tracking system and/or apparatus indicating on display panel the progress of the aircraft, and which is capable of continuing to track an aircraft along a predetermined path past a series of detection stations despite failure of some of the detection stations in the series, and which indicates such failure of such detection station on such panel.

Still another object is to provide an aircraft actuated tracking system or apparatus employing a series of detection stations along a predetermined path and indicating on a display panel the progress of the aircraft, with provision for varying the minimum spacing between aircraft with respect to the detection stations.

A still further object is to provide an aircraft actuated signal control system for maintaining a desired minimum spacing between taxiing aircraft and which signal control system may be associated with an aircraft tracking system or apparatus.

A still further object is to provide an aircraft actuated tracking system having a series of detection stations along a taxi-strip or runway and a display panel for indicating progress of aircraft along such taxi-strip or runway and including giving a distinctive indication of the position of entry of an aircraft entering by one of said detection stations intermediate the ends thereof and holding said distinctive indications until released at will.

Other objects will become apparent upon reference to the accompanying specification, claims and drawings in which:

FIG. 1 illustrates, in block form, the preferred embodiment of the present invention applied to a taxi-strip or runway, shown in plan view.

FIG. 1a illustrates, in plan view, a typical airport with detectors of the present invention disposed along the sides of the runways and taxi-strips and in the approach and climb corridors.

FIG. 2, including FIGS. 2a, 2b, 2c, 2d, 2e, 2f and 2g illustrates the schematic circuit diagram of the preferred form of the present invention applied to five or more detector stations for detection and tracking of aircraft.

Figure 3:
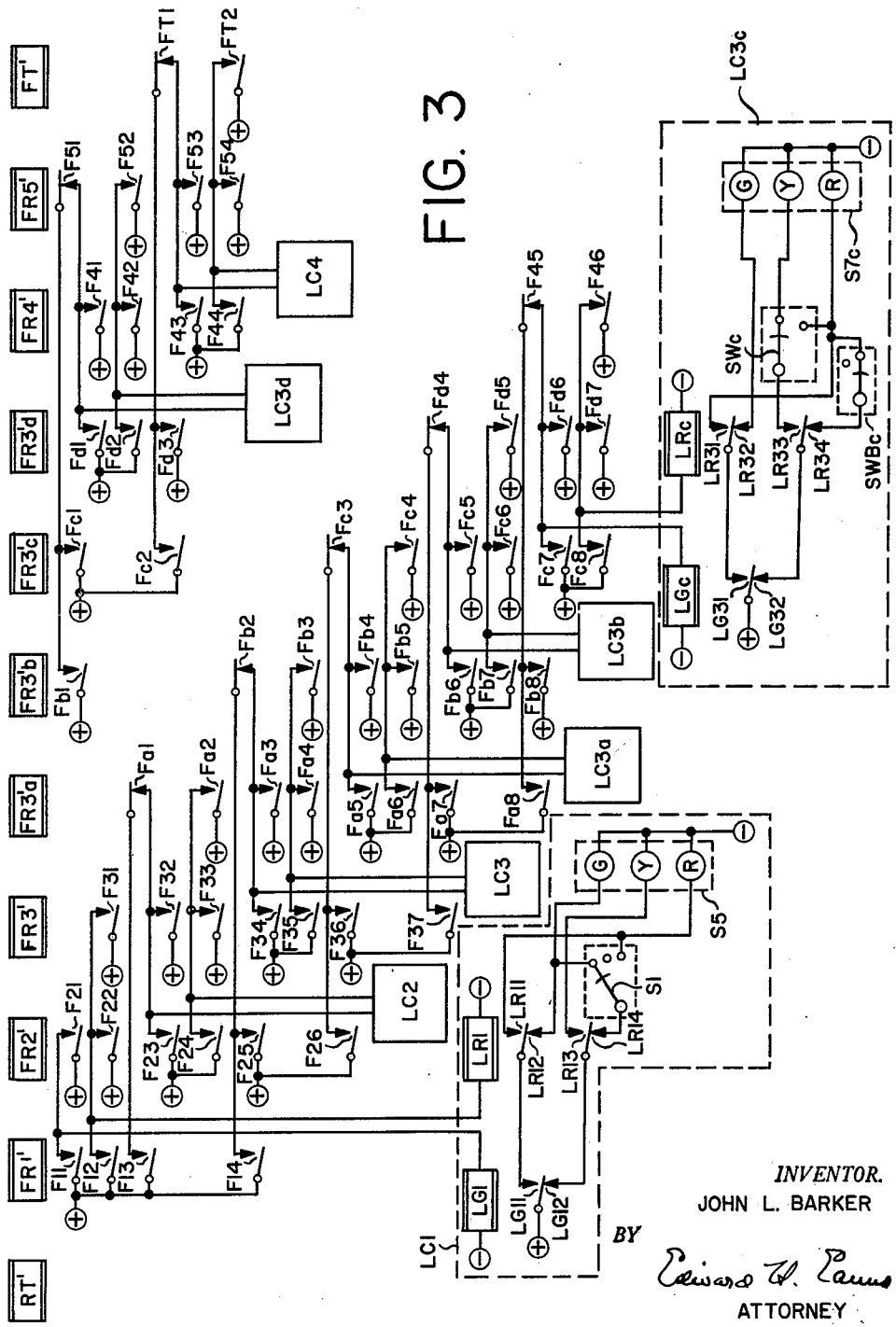

FIG. 3 illustrates, in schematic circuit form one form of a signal control system that may be associated with the tracking system illustrated in FIG. 2.

Figure 4:
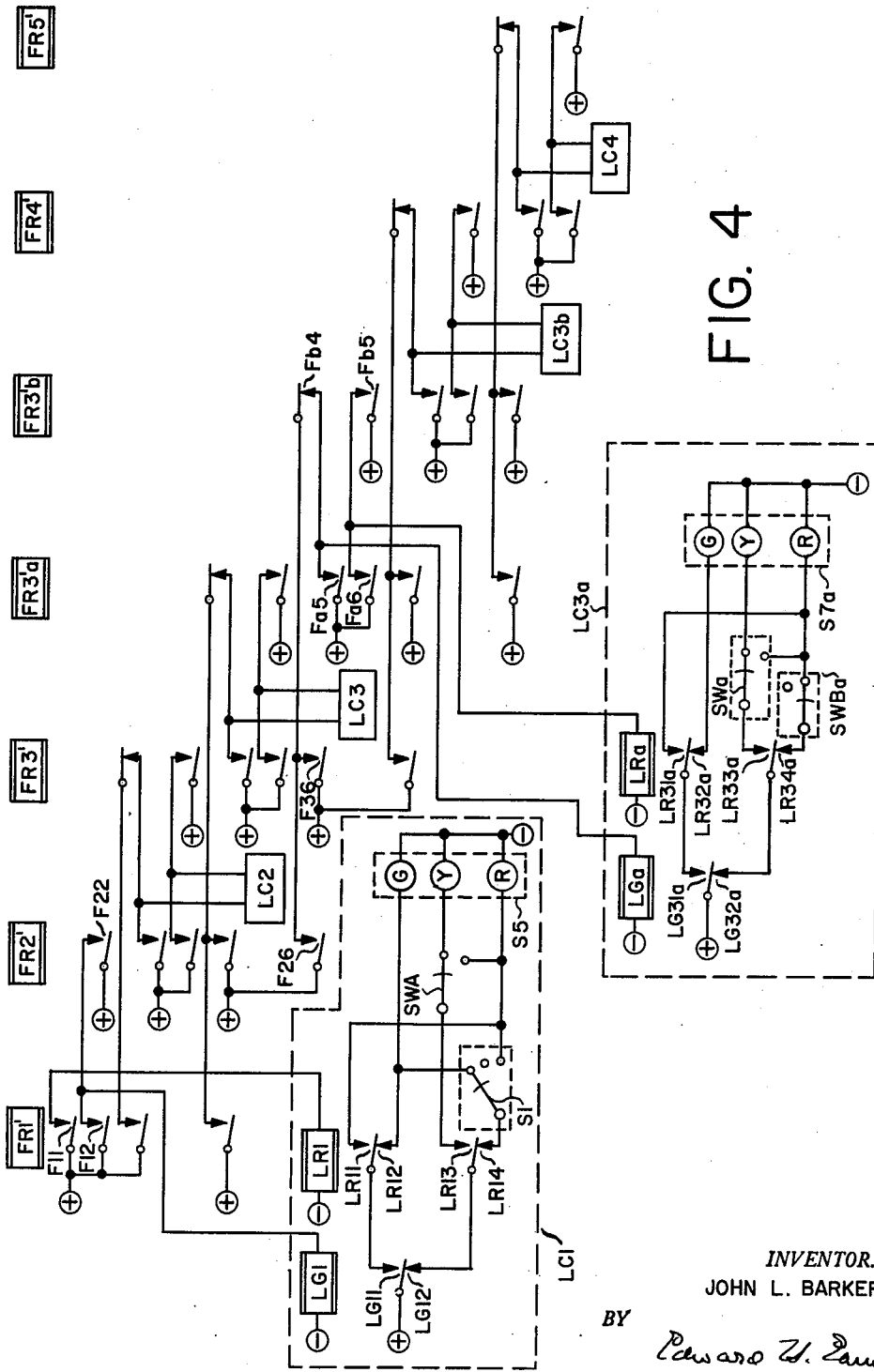

FIG. 4 illustrates, in schematic circuit form an alternate form of a signal control system that may be associated with the tracking system illustrated in FIG. 2.

Figure 5:
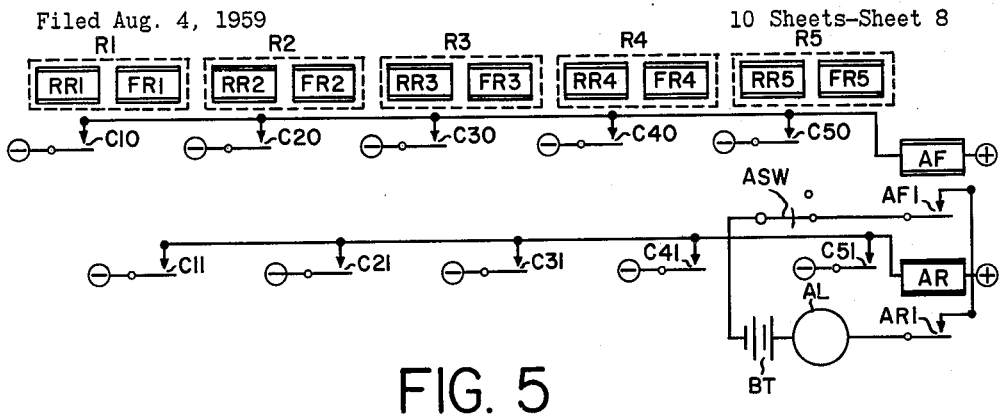

FIG. 5 illustrates in schematic circuit form, circuitry that may be associated with the tracking system and apparatus of FIG. 2 to provide indication of the presence of at least two aircraft traveling in opposite directions on the same taxi-way.

FIG. 6 illustrates, in block form, the relays in the relay assembly illustrated in block form in FIG. 1 and in schematic circuit form in FIG. 2 and shows the relays in the associated signal control system illustrated in schematic circuit form in FIG. 3 and in FIG. 4.

FIG. 7 illustrates how the several sheets of FIG. 2 are fitted together to illustrate a complete aircraft tracking system.

Referring to FIG. 1 in more detail, a block diagram of the tracking system and the associated signal control system is illustrated with five detector stations DS1, DS2, DS3, DS4 and DS5 equally spaced along an airport taxi-strip or runway generally designated TXS with associated display panel DP. Associated with each respective detector station, so as to become a part thereof is a detector device D1, D2, D3, D4, D5 respectively, a relay assembly R1, R2, R3, R4, R5 respectively and output C1, C2, C3, C4 and C5 respectively to panel DP.

The term "detector station" or "detection station" represents a grouping of apparatus for, or associated with, a detection point, for convenience of reference. The separate units included in a detector station may be divided between a position at the side of a taxi-strip or runway and a centrally located position, such as a control tower, for example.

Signal control circuits L1, L2, L3, L4 and L5 are associated with the relay assemblies R1, R2, R3, R4 and R5 respectively and cooperatively control traffic control signals of the conventional type generally employed for control of vehicle traffic on a roadway. Except for the initial detector station, each of the associated signal control circuits and light relays control two sets of signals. The initial detector station, DS1, and the associated signal circuit and light relays L1 jointly control one set of signals S5 in cooperation with manually operated switch S1 on the display panel.

Similarly, detector station DS5, the initial detector station for the opposite direction in association with signal circuit and light relays L5, jointly controls one set of signals S15, in cooperation with manually operated switch S2 on the display panel.

In the embodiment, as presented in block form the relay assemblies R2, R3 and R4 are interconnected via multiple connections generally designated CC, as illustrated between relay assemblies R2 and R3, for example, the circuitry of all the cable connections being illustrated in detail in FIG. 2. Similar interconnections between the signal control circuit blocks L2, L3 and L4 appear below, with the circuitry of the cable connections illustrated more fully in FIG. 3 and FIG. 4. Relay assembly R1 is interconnected between relay assembly R2 and termination assembly T while relay assembly R5 is interconnected between relay assembly R4 and termination assembly T'.

Individually connected to each relay assembly is an associated detector unit. The detector unit may, by way of example, be mechanical, electrical or electronic, sensitive to either pressure, light, magnetism, heat or vibration, adjusted to close a set of contacts upon actuation by a vehicle, such as an aircraft and to release such contacts after actuation has ceased. In the preferred form, as illustrated in FIG. 1, the detector unit is illustrative of the type commonly known as a radar vehicle detector. This detector may be generally similar to that which is fully described in my copending application, Serial Number 511,995, filed May 31, 1955, under the name "Control," now issued U.S. Patent 2,965,893, entitled "Vehicle Detector."

Other types of detectors may be used for ground detection but simplicity of installation and lack of any obstructions on the taxi-strip or runway lends the radar vehicle detector to be the preferred form of detector unit. Of course, detection in the approach and climb corridors of airborne aircraft could not be made by pressure sensitive detectors.

The detector unit may be placed off the taxi-strip and so situated and located so as to project a radio beam across the taxi-strip generally perpendicular to the line of travel of taxiing aircraft along the taxi-strip. In my said copending application Number 511,995 I have described and explained that the antenna of the said radar vehicle detector may be arranged for horizontal polarization so as to project a beam of ultra high frequency radio energy in a confined area and direction. I have described the positioning of such antenna as over the roadway thus projecting a beam downward so as to detect vehicles passing thereunder.

Thus a similar arrangement of polarization may be employed to project a confined ultra high frequency radio beam horizontally across the taxi-strip by positioning the antenna of the radar vehicle detector at the side of the taxi-strip and aiming the antenna for horizontal projection rather than vertical projection with the detector unit adjusted to provide a relatively narrow fan-like beam somewhat as illustrated in FIG. 1 as F1, F2, F3, F4 and F5.

It has been found that satisfactory response to the actuation of an aircraft may be obtained with the detector unit approximately 30" above the surface of the taxiway with the radio beam projected horizontally across the taxiway similar to that illustrated in FIG. 1, although other heights may be used if desired.

The beam also may fan somewhat diagonally upward across the taxiway.

Detection of the presence of taxiing aircraft, as well as other surface vehicles, may be made by actuation of detector units D1, D2, D3, D4 and D5 individually, and the detection pulse, via closure of a pair of contacts, is channeled to relay assemblies R1, R2, R3, R4 and R5 via leads 115, 215, 315, 415 and 515 respectively.

Response to the detection pulse is obtained in the relay assembly, as more fully described below, and which in turn, effects the relays in the signal circuits, as more fully described below.

Output from the relay assemblies via lines C1, C2, C3, C4 and C5 each of which represents several leads, is applied to the display panel DP to illuminate indicator lamps L10, L11 and/or L12 associated with relay assembly R1, L20, L21 and/or L22 of R2, L30, L31 and/or L32 of R3, L40, L41 and/or L42 of R4 and L50, L51 and/or L52 of R5 over the respective wires. It will be found, in the description below that the indicator lamps L10, L11, L12, etc. have similar numbers in FIG. 2 as in FIG. 1 for convenience of reference.

The switches 162 and 132, 262 and 232, 362 and 332, 462 and 432 and 562 and 532 on the panel DP associated with the respective relay assemblies are each spring-loaded switches which may provide clearing of the tracking system as more fully described below.

Pushbuttons 149, 249, 349, 449 and 549 are for manual release of the respective ER series of relays of the relay assembly, as more fully described below.

The horizontal row of switches beginning with S10 and extending to S51 serve to control the number of detecting stations in the locking circuit of the directional relays, as more fully described below.

The rectangle TX, in which is found the indicator lamps on the display panel DP, simulates the taxi-strip TXS.

The switch S3 represents a three position switch which may provide for normal operation for left to right traffic, in its rightmost position, normal operation for right to left traffic, in its leftmost position and a neutral position which permits non-preferential entrance from both directions. The switch S3 controls certain relays in the termination units T and T', as described below.

The switch S1, a three position switch, cooperates with the light relay circuits of signal circuit L1 to provide for a green rest signal, red rest signal or rest normally dark at the entrance of the taxiway, as described, at signal S5, for aircraft traveling from left to right, for example.

The switch S2 similarly provides red rest, green rest signal, or a dark signal at signal S15, in cooperation with the light relay circuits L5, for aircraft traveling from right to left.

The set of signals S6 and S18 are controlled by light relay circuits in L2, S7 and S17 by L3 and S8 and S16 by L4. The signals S5, S6, S7, S8 and S9 control passage of an aircraft from left to right along taxiway TXS and signals S15, S16, S17, S18 and S19 control passage of an aircraft from right to left.

Each set of signals is illustrated as a set of three lamps which may be of the red for stop, green for go and yellow for caution variety of the type generally employed for vehicle traffic on a roadway.

Since it is here presumed that detector station DS1 is the last station in the right to left sequence of detector stations it is assumed that the signal S19 may be tower operated or manually operated from the display panel, the signal to be illuminated may depend upon where the taxiway leads to in that direction, thus the signal S19 is not connected. This is also true with signal S9 as it controls traffic from left to right and therefore may also be tower operated, since it is the last signal at the right end of the taxiway.

The open space curving across the taxi-strip TXS and between the detector stations DS3 and DS4 indicates that the taxi-strip may be longer and additional detector stations may be spaced along the taxi-strip. A similar division is indicated in the panel DP.

The detector units D1, D2, etc. may be spaced along the taxi-strip, as desired and fewer than five detector stations or a number in excess of five detector stations may be used depending upon the length of the taxi-strip and the distance between detector stations. It has been found that a distance between detector units, of the order of 250 feet accords close control over taxiing aircraft and is the preferred distance between detector units for control of anticipated heavy traffic with aircraft traveling at normal taxi speeds, although larger or smaller distances between detector units may be used, as desired.

FIG. 1 illustrates the several units of the detector stations deployed along the taxi-strip TXS. Of course, the signals and detector units have need of specific placement at the side of the taxi-strip but the remainder of the equipment i.e., the relay assembly units, the signal circuits and light relays, terminating units and display panel may be placed at some remote place, as for example in the control tower.

While FIG. 1 illustrates a tracking system and control signals for one taxi-strip or runway, additional such systems may be employed for other taxi-strips and/or runways, as desired. Separate display panels for each taxiway may be employed or one panel may be used to depict the entire layout of the airport.

Referring to FIG. 1a, a plan view of an airport is presented, by way of illustration, to indicate where detectors may be positioned on various runways and taxi-strips and under the approaches to the runways.

The plan view generally includes an apron or ramp where aircraft are generally loaded and unloaded and a tower overlooking the apron and the runways and taxi-strips. The three runways RY1, RY2 and RY3 laid out in heavy black lines, are for purposes of illustration only as the runways of other airports may be laid out in a different pattern and have more or less runways than presented here.

A network of taxi-strips TXS1, TXS2, and TXS3 generally connect the ends of the runways with run-up areas indicated as partial circular areas.

The small circles, D, represent detectors spaced along the taxi-strips and runways and in line with the center of the approach to the runways.

At the upper end of runway RY1, one such detector is represented while three such detectors are represented at its lower end. It will be appreciated that each runway may be a mile or more in length or may be shorter.

At the upper end of runway RY2 three such detectors are represented while only one is represented at its lower end.

At the upper end of runway RY3 one detector is represented and three detectors appear represented at its lower end.

Although some of the runways show only one detector at one end and three detectors at its other end, as for example, runway RY1, it will be appreciated that more than one detector may be used at the end showing only one.

The detectors disposed along the taxi-strips may be spaced of the order of 250 feet apart, for example, while the detectors disposed along the sides of the runways may be somewhat further apart, of the order of 1500 feet apart, for example, because of higher speeds attained on the runways with respect to taxiing speed.

The detectors disposed off the ends of the runways, in the approach and climb corridors, for example, may be placed at a position just off the end of the runway with the next detector of the order of one half mile away, in line with the center of the runway and the third detector positioned in line with the center of the runway at a distance of the order of one mile from the end of the runway, for example.

Of course, other distances and spacing of detectors may be used if desired.

The detectors here represented may be similar to the detectors represented in FIG. 1 and the three detectors under the approach corridor of the runway, RY3, for example, may be the first three detectors in a tracking system, and may, for example be detectors D1, D2 and D3 of FIG. 1.

It will be appreciated that the detectors placed off the runways in the approach and climb corridors would be adjusted to direct an ultra high frequency (UHF) radio beam vertically upward as opposed to the detectors positioned along the sides of the runways and taxi-strips.

It has been found that an antenna of the same general construction as illustrated in my said copending application may be employed to direct a UHF radio beam vertically upward by facing the antenna upward so as to provide a somewhat fan shape beam that widens with altitude. Thus with the vertically directed beam airborne aircraft passing through the directed beam are detected and actuate the detector.

It will also be appreciated that the antenna of the detectors positioned at the side of the runways, near the ends of the runway may direct a fan shape beam across the runway which beam may include angular extension into the air which is increased in height by distance from the antenna so the airborne aircraft over that section of the runway may be detected through actuation as the aircraft passes through the beam of the antenna of the detector.

Thus, detectors in the approach and climb corridors of the runways will detect aircraft in flight while the detectors disposed along the side of the runways will detect aircraft in flight as well as on the ground.

The detectors disposed along the sides of the taxi-strips will detect aircraft on the ground proceeding along the taxi-strip.

In FIG. 1a the signals of the signal control circuits which may be employed in association with the tracking apparatus have been eliminated to prevent overcrowding but are illustrated in FIG. 1 as described above.

Figure 2G:
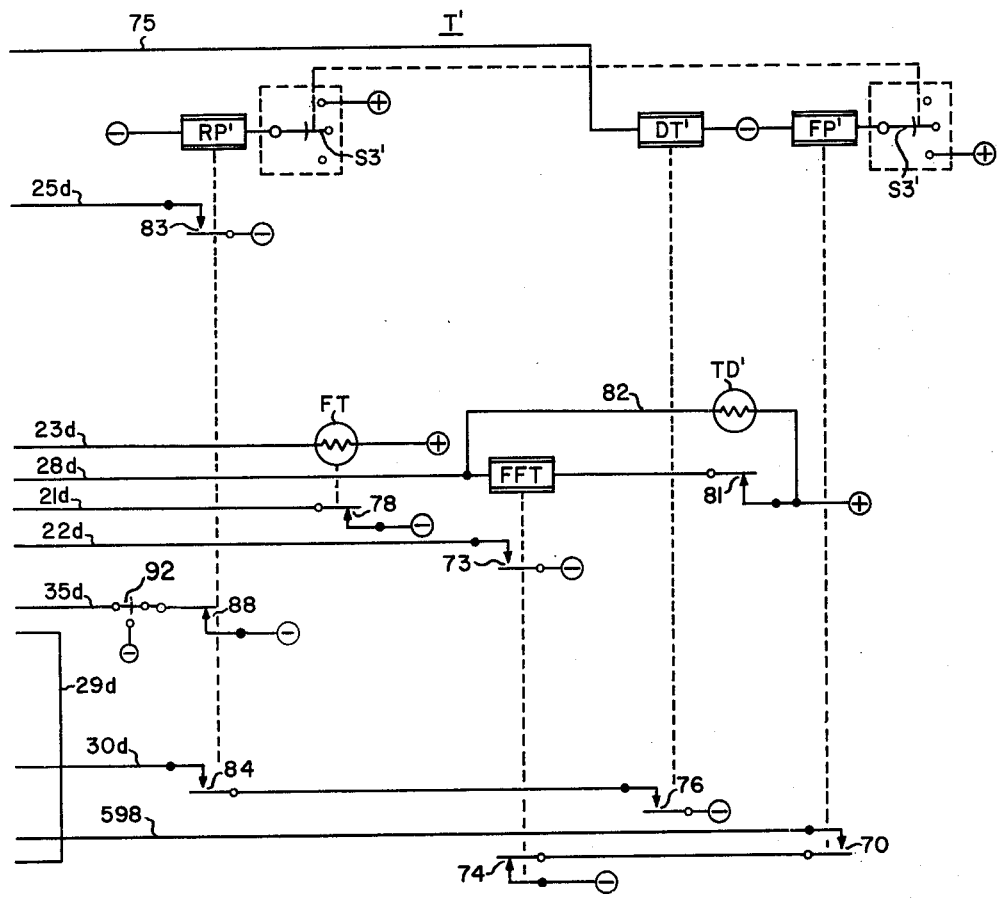
Figure 2F:
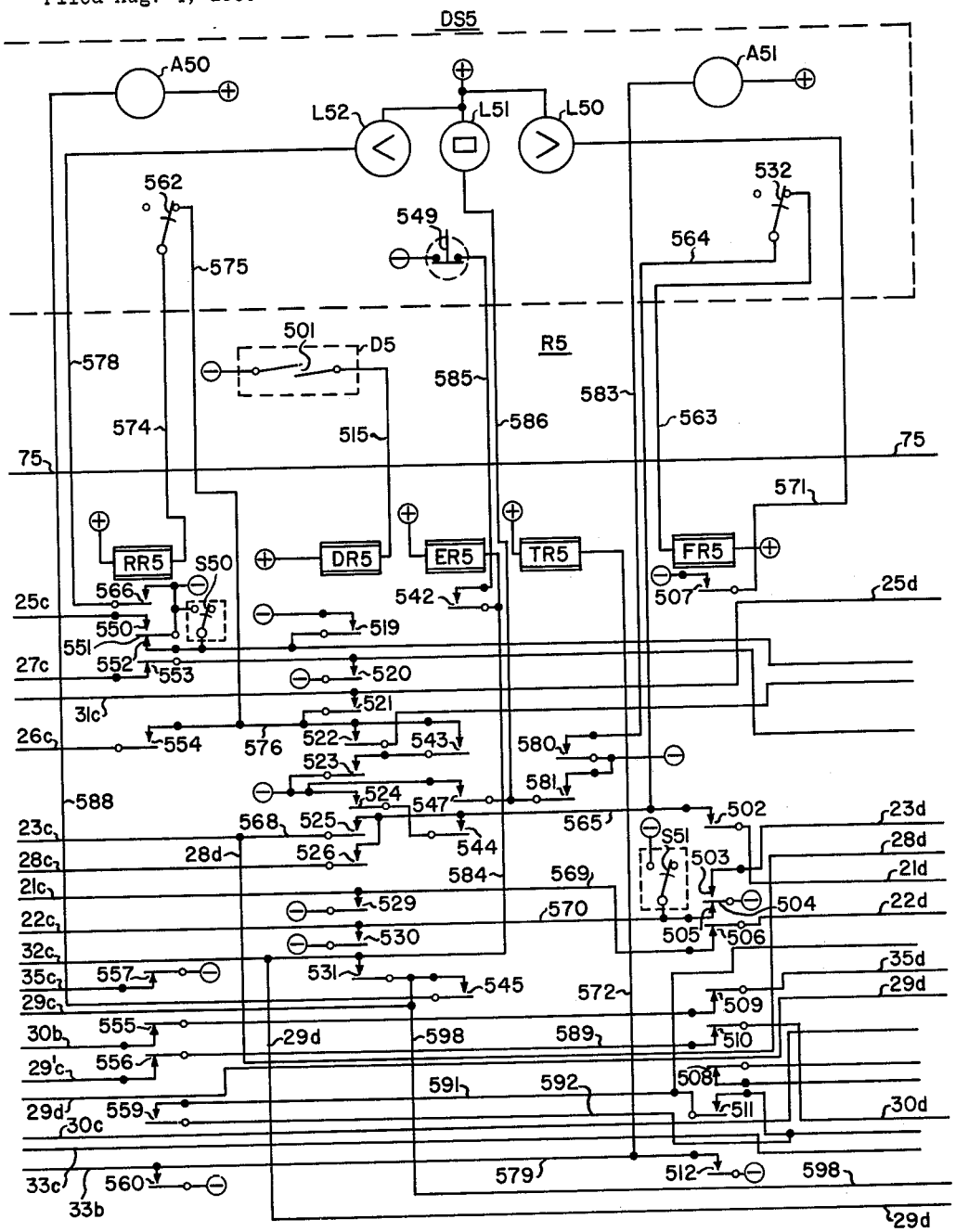
Figure 2E:
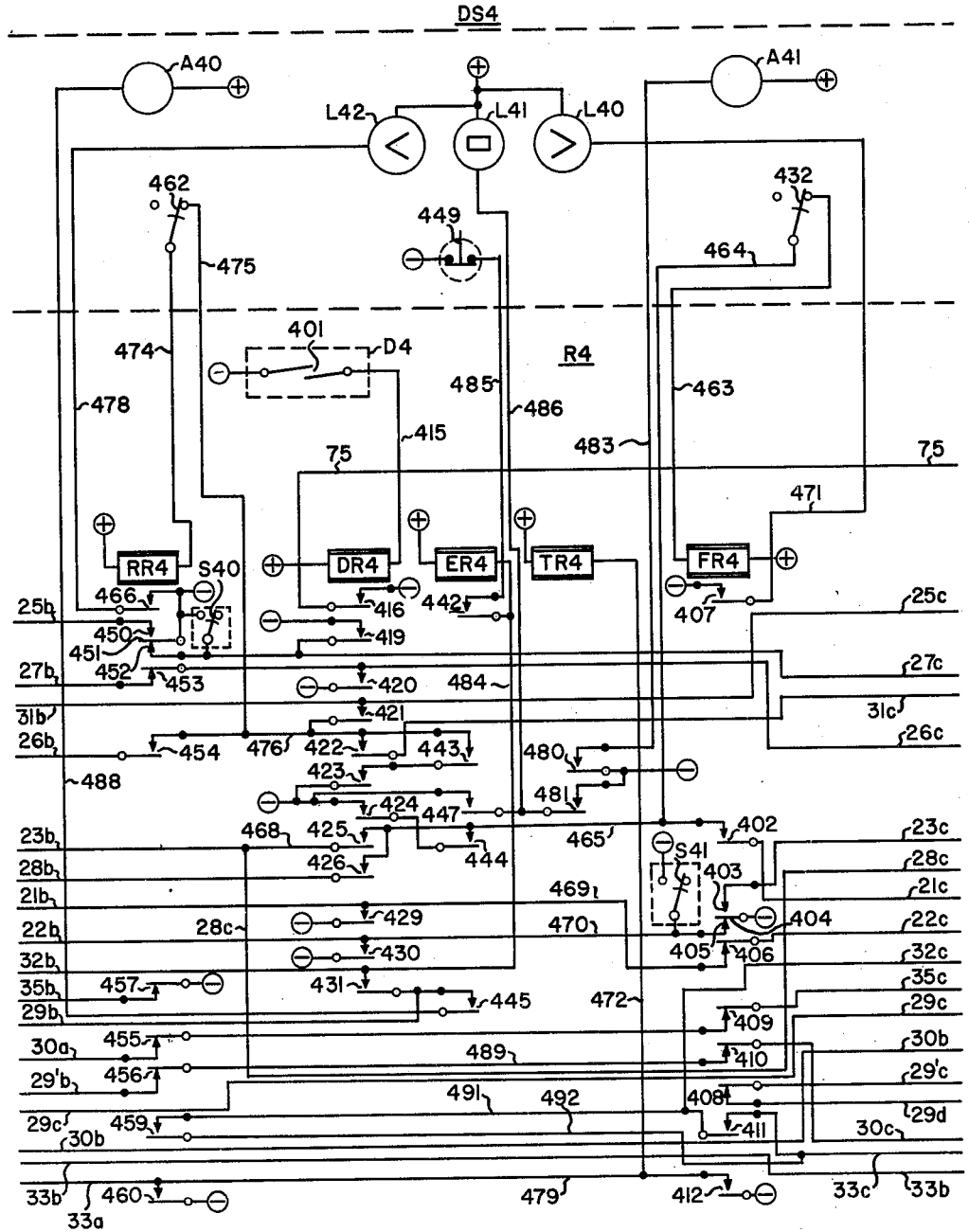
Figure 2D:
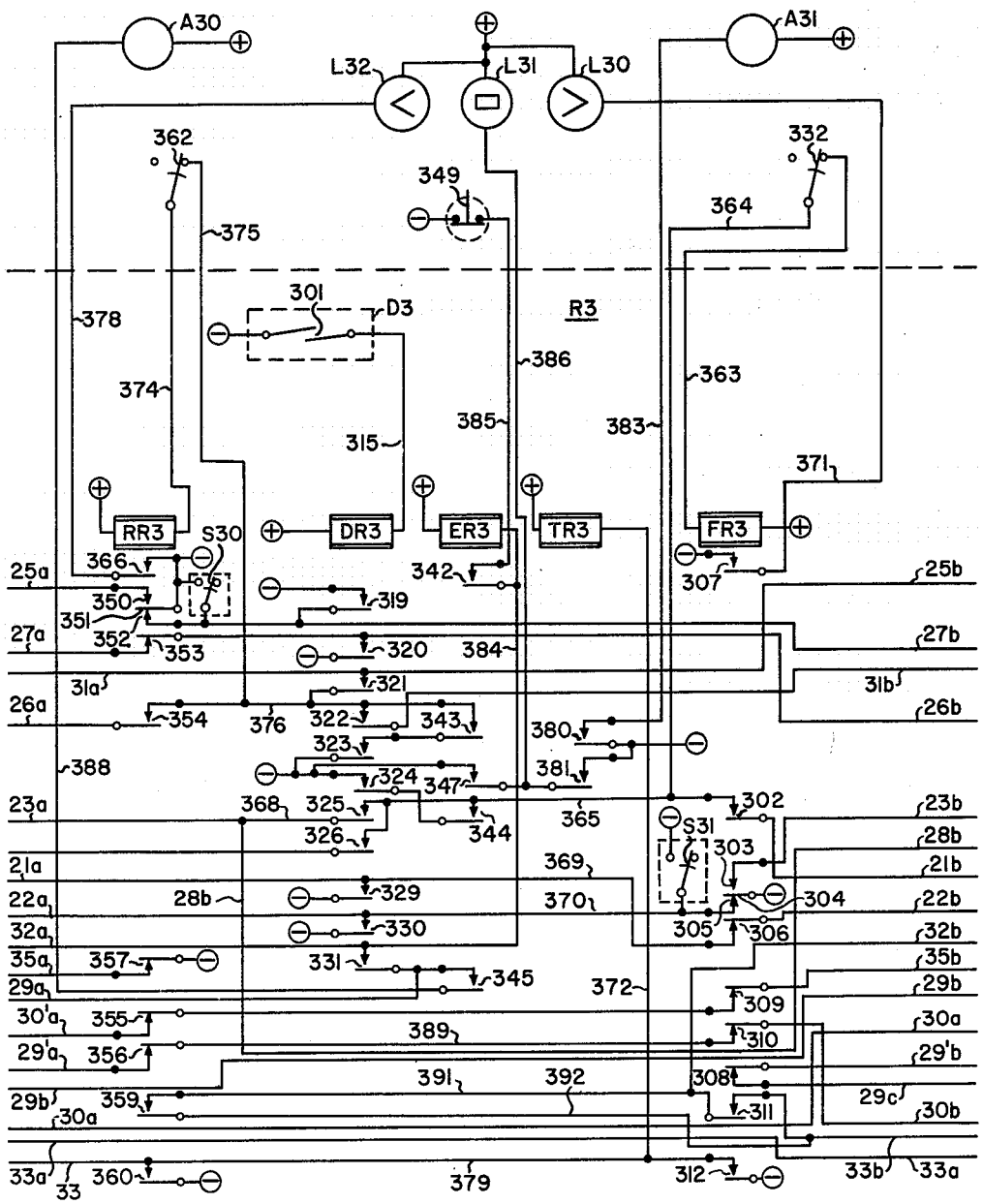

Referring generally to FIG. 2, which is a composite of FIGS. 2a, 2b, 2c, 2d, 2e, 2f and 2g, arranged side by side as shown in FIG. 7, FIG. 2, by way of example, illustrates, in schematic circuit form, five detector stations and outputs therefrom and two termination units thus illustrating the preferred embodiment of the apparatus of the tracking system. Referring particularly to FIG. 2d as generally typical of an intermediate detector station, shown in FIG. 1 as DS3, at the top of the fig., isolated by two horizontal broken lines are three indicator lamps L30, L31 and L32, two normally closed spring-loaded switches 332 and 362, and a manual normally closed pushbutton 349. These components appear in FIG. 1 on the display panel DP similarly labeled.

Appearing in FIG. 2d are two alarms A30 and A31. These alarms do not appear on the display panel DP in FIG. 1 to prevent overcrowding, but the alarms presented in FIG. 2d may be audible alarms, or any other type alarm, but in the preferred form are audible alarms.

Below the broken lines representing part of the display panel is a broken box D3, containing a set of open contacts 301. The broken line box D3 represents the detector unit D3, in FIG. 1. The open contacts 301 represent the contacts of the detector unit that are closed upon detection or actuation by an aircraft as the aircraft passes through the projected radio beam or actuates any other type detector that may be employed in lieu thereof.

Generally below the representation of the detector unit is the schematic circuit drawing of the relay assembly, including relays RR3, DR3, ER3, TR3 and FR3 illustrated deenergized with the respective contacts arranged vertically below each relay.

Below relay RR3 and slightly to its right is a switch S30, illustrated open and below relay FR3 and slightly to its left is a switch S31, illustrated open. These two switches, surrounded by a broken line box represent the switches of similar number appearing on the display panel DP in FIG. 1.

Figure 2C:
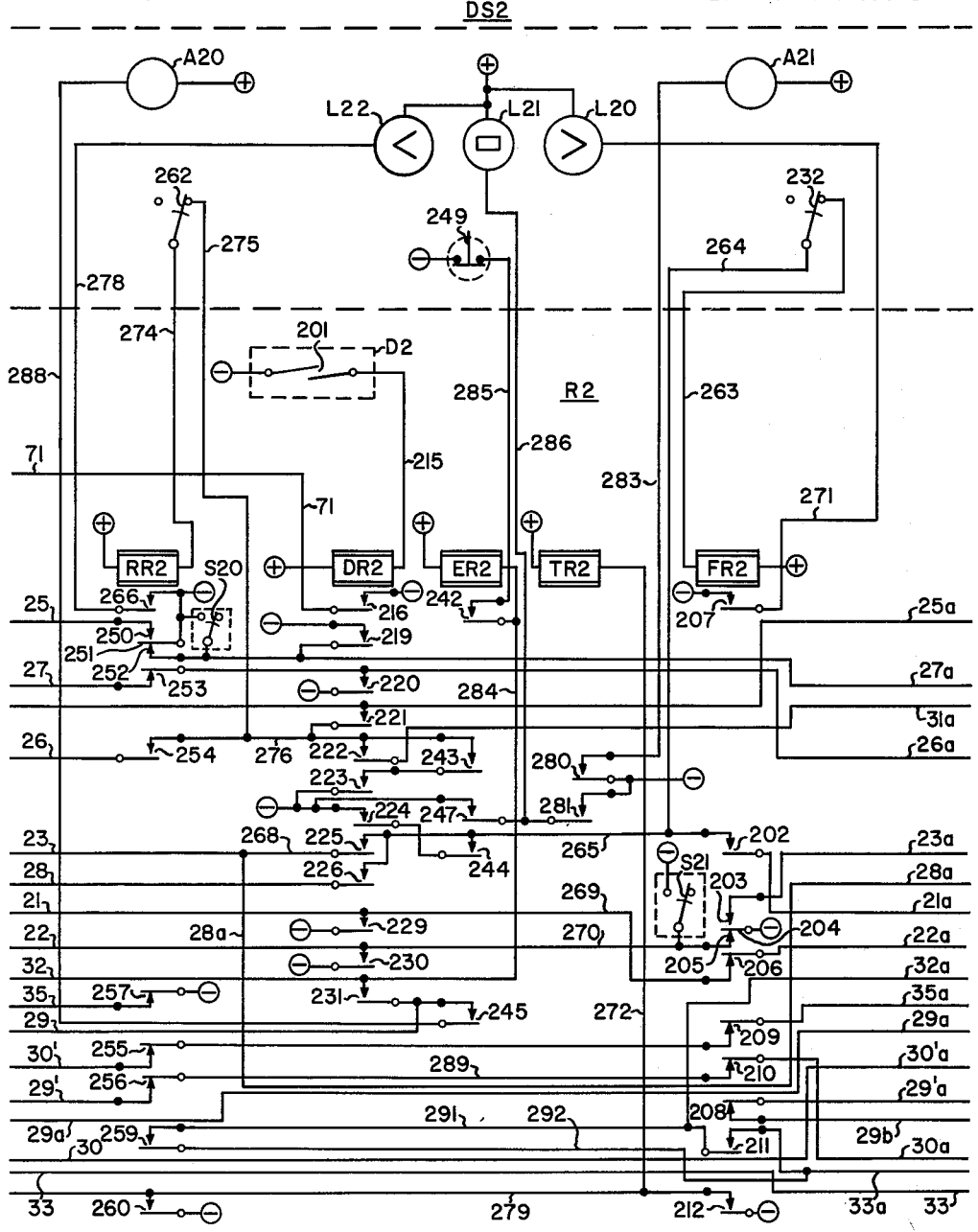

The leads at the left of relay assembly R3 in FIG. 2d are connected to the similarly numbered leads at the right of relay assembly R2 in FIG. 2c, as generally indicated by the lines cc between R2 and R3 in FIG. 1.

Correspondingly, the lines to the right of relay assembly R3 in FIG. 2d are connected with the similarly numbered lines at the left of relay assembly R4 in FIG. 2e, which connections correspond to the interconnecting lines between R3 and R4 in FIG. 1.

It should be noted that relay assembly R3 in FIG. 2d, and its interconnections with the relay assemblies on both sides of it, is here considered typical of the circuitry and connections of any additional relay assembly units that may be inserted into and employed in a tracking system, in addition to the five relay assemblies illustrated, for use on a longer taxi-strip. Although relay assemblies R1, R2, R4 and R5 of FIGS. 2b, 2c, 2e and 2f respectively are not considered typical relay assemblies, the circuitry of the relay assemblies R1, R2, R4 and R5 includes the same number of relays with contacts somewhat similar to those of relay assembly R3, and outputs similar to those of assembly R3. Some circuitry of R1, R2, R4 and R5 is slightly different from that of R3, which difference will appear more fully below.

The most apparent difference between relay assembly R3 and the other relay assemblies R1, R2, R4 and R5 is the interconnections between the relay assemblies.

Figure 2B:
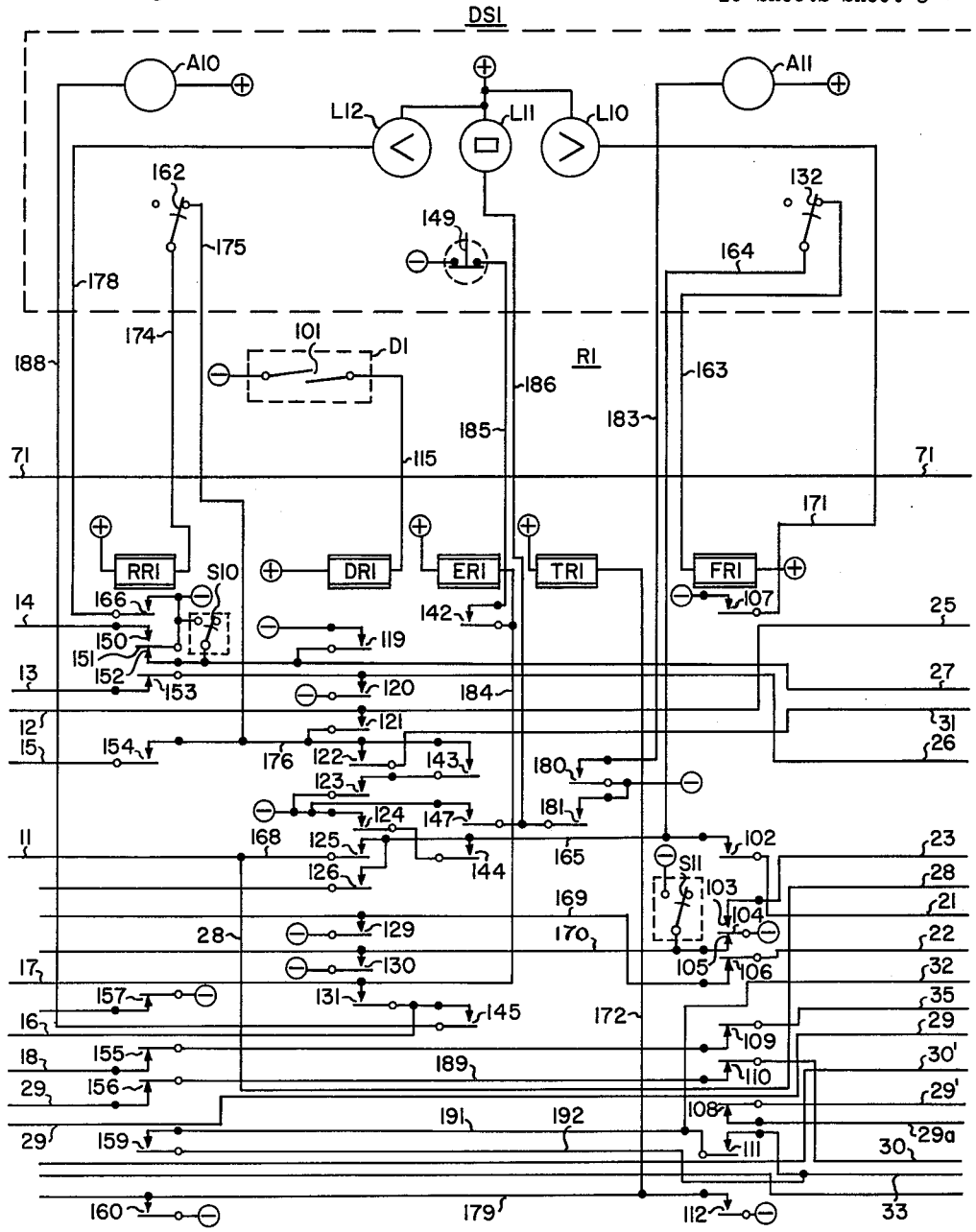

The relay assemblies R1 and R2, FIGS. 2b and 2c, are both connected to the termination unit T in FIG. 2a and have substantially different interconnections, to the left, between relay assembly R1 and termination unit T and relay assembly R2 and termination unit T when compared with the interconnections of relay assembly R3 traced to the left.

The interconnections of assemblies R4 and R5 of FIGS. 2e and 2f are likewise substantially different interconnections, traced to the right, when compared with the interconnections of relay assembly R3, traced to the right. Relay assembly R4 is interconnected with termination unit T', and relay R5 is interconnected with termination unit T', and as more fully described below, with the circuitry of relay R3 remaining unextended to termination unit T'.

Slight modifications in the circuitry of relay assemblies R1, R2, R4 and R5, when compared with the circuitry of relay assembly R3, are necessitated because of the interconnections of the individual relay assembly units with the termination units as more fully described below.

FIG. 2a illustrates the circuitry of termination unit T, shown in block form in FIG. 1, that part of FIGS. 2b, 2c, 2d, 2e and 2f generally below the broken line box D1, D2, D3, D4 and D5 illustrates the circuitry of the relay assemblies R1, R2, R3, R4 and R5 shown in block form in FIG. 1 and FIG. 2g illustrates the circuitry of termination unit T' shown in block form in FIG. 1 and similarly labeled.

FIG. 2a illustrates in schematic circuit form the circuitry that may be included in the termination unit shown in block form in FIG. 1 labeled T the relays RP and FP, illustrated deenergized in FIG. 2a are controlled through selection by manual operation of a three position switch S3, also shown on the panel DP in FIG. 1. For convenience of illustration two ganged three position switches are illustrated in FIG. 2a, both labeled S3 although it is obvious that only one three position switch is actually needed for such selection.

The relay DT, illustrated deenergized is connected via line 71 to a contact 216 under relay DR2, illustrated in FIG. 2c, through which a connection to ground may be made upon energization of relay DR2. Relay DT may also be connected in parallel with relay DR2 in the alternative.

The holding circuit for the relay RRT is controlled by a contact 79 controlled by relay TD which may be in the form of a thermal time delay relay. After relay TD is energized there is a delay, which may be adjusted up to several seconds, for example, before opening of its controlled contact.

The relay RT may be of a type similar to relay TD, the thermal time delay type relay and controls opening of its contact 87 in a manner similar to relay TD.

The contacts controlled by each individual relay in FIG. 2a are arranged vertically above/or below the relay by which the contacts are controlled as indicated by the vertical dash lines.

FIG. 2g illustrates in schematic circuit form the circuitry that may be included in the termination unit shown in block form in FIG. 1, labeled T'. The relays RP' and FP', illustrated deenergized in FIG. 2g are controlled through selection by manual operation of a three position switch S3'. The three position switches S3 of FIG. 2a and S3' of FIG. 2g may be combined under the single switch S3 on the panel DP shown in FIG. 1. The switches S3' in FIG. 2g are illustrated as two three position switches for convenience of illustration.

The relay DT', illustrated deenergized, is connected via lead 75 to a contact 416 under relay DR4 in FIG. 2e through which a connection to ground may be made upon energization of relay DR4. Relay DT' may also be connected in parallel with relay DR4 in the alternative.

Relays FT and TD' may be similar to the thermal time delay relays RT and TD of FIG. 2a with relay TD' controlling a normally closed contact 81 in the holding circuit for relay FFT.

The contacts controlled by the several relays in FIG. 2g are arranged vertically above and below the relay by which the contacts are controlled as indicated by the vertical dash lines.

Referring now to FIG. 2, operation of the circuits of the several detector stations, including the vehicle detectors, relay assembly units and outputs of the individual relay assembly unit shall be described with reference to actuation by a single aircraft normally entering upon the taxi-strip, normally proceeding from left to right along the same and executing a normal exit therefrom. It shall be assumed that the switches S3 and S3' in FIG. 2a and FIG. 2g respectively have been positioned in their lowermost position thus causing energization of relay FP in FIG. 2a and relay FP' in FIG. 2g. The circuit energizing relay FP is complete from ground, represented by a minus in a circle, which also represents a common ground, through the lowermost position of switch S3, the coil of relay FP to a positive Direct Current (D.C.) supply of the order of plus 60 volts, for example, represented by a plus in a circle. The circuit energizing relay FP' in FIG. 2g is complete from ground, through the coil of relay FP' to the positive D.C. supply.

Energized relay FP closes its normally open contacts 68 and 69 and opens normally closed contact 89 while energized relay FP' in FIG. 2g, closes its normally open contact 70 thus the tracking system and apparatus is prepared to accept and track an aircraft proceeding from left to right along the taxi-strip.

It shall also be assumed that the switches S10, S11, S20, S21, S30, S31, S40, S41, S50 and S51 are open as illustrated in FIGS. 2b through 2f respectively.

For purposes of clarity and to avoid confusion it shall further be assumed in this following description of the operation of FIG. 2 that the signal circuits, including the light relays and the signals are disassociated from the tracking system and apparatus.

Further let it be assumed that the tracking system and apparatus is at rest with all indicator lamps extinguished and all relays deenergized except FP and FP' which are energized as aforestated.

With the previous assumed conditions let it now be assumed that an aircraft enters upon the taxi-strip TXS, following normal procedure, and proceeds from left to right along the said taxi-strip.

It should be understood that the taxi-strip TXS is representative of a section of the network of taxi-strips or taxi-ways on an airport, that are controlled as illustrated; that one such section of taxi-strip may be isolated from other sections in the network by runways at both ends of the particular taxi-strip section.

As the aircraft proceeds from left to right from the left end of the taxi-strip TXS as for example in FIG. 1, the aircraft proceeds into the beam F1 of detector D1 thereby actuating detector D1 causing closure of contact 101 in FIG. 2b thus completing a circuit to energize relay DR1 from ground, through closed contact 101, line 115, the coil of relay DR1 to positive D.C. supply. Energized relay DR1 closes its contacts 119 through 126 and 129 through 131.

Closure of contact 125 completes an energizing circuit for relay FR1 from D.C. plus through the coil of relay FR1, lead 163, switch 132, lead 164, lead 165, contact 125, lead 168, lead 11, between relay assembly R1 and termination unit T, to contact 68 of relay FP to ground.

Energized relay FR1 closes its contacts 107, 102, 103/104, 111 and 112 and opens its contacts 104/105, 106, 109, 110 and 108.

Closure of contact 102 completes a holding circuit for relay FR1 from D.C. plus through the coil of relay FR1, lead 163, switch 132, lead 164, contact 102, lead 21, one of the interconnecting leads between relay assembly unit R1 and R2, lead 269 in FIG. 2c, contact 206, lead 22a, one of the interconnecting leads between relay assembly R2 and R3, lead 370 in FIG. 2d, contact 305/304 to ground.

Closure of contact 107 completes a circuit to illuminate indicator lamp L10 on panel DP from ground through contact 107, lead 171, lamp L10 to D.C. plus.

Closure of contact 112 completes a circuit for energizing relay TR1 from ground through contact 112, lead 172, the coil of relay TR1 to D.C. plus, however the relay TR1 is a delayed action relay with the delay on pull-in and relay TR1 does not pull-in at this time. The delayed pull-in of relay TR1 may be adjusted to exceed the longest allowable time that relay FR1 will remain energized for an aircraft proceeding at normal taxi speed to eventually effect deenergization of relay FR1 as explained below.

While the aircraft is passing through the beam F1 actuation of detector D1 is maintained and upon the aircraft's exit from the beam F1 actuation of detector D1 ceases and contact 101 opens, thus breaking the circuit energizing relay DR1. Relay DR1 does not fall out immediately since it is of the type relay that is delayed on release. The relay DR1 is delayed on release to provide against multiple actuations by the same aircraft, the delay being of the order of one to two seconds, for example.

Upon fallout of relay DR1 its contacts open thus breaking at contact 125 the pull-in circuit of relay FR1 while relay FR1 holds energized through its own contact and the holding circuit previously described.

As the aircraft proceeds, it will next pass into the beam F2 and cause actuation of detector D2 which causes closure of contact 201 in FIG. 2c. Closure of contact 201 completes an energizing circuit for relay DR2 from ground through contact 201, lead 215, the coil of relay DR2 to D.C. plus.

Energized relay DR2 closes its contacts 216 and 219 through 226 and 229 through 231. Closure of contact 216 provides for energization of relay DT in termination unit T in FIG. 2a, from ground through contact 216, lead 71, the coil of relay DT to D.C. plus. Relay DT is a delayed action relay that is delayed on pull-in to provide proper sequence of energization between relay DT and relay FR2 upon closure of the contacts of relay DR2.

Relay FR2 is energized via closure of contact 225 of relay DR2 thus completing a circuit from D.C. plus through the coil of relay FR2, lead 263, switch 232, lead 264, lead 265, contact 225, lead 268, lead 23 to FIG. 2b, contact 103/104 to ground.

Relay FR2 closes its contacts 207, 202, 203/204, 211 and 212 and opens its contacts 204/205, 206 and 209, 210 and 208. Closure of contact 207 completes an illuminating circuit for indicator lamp L20 from ground via lead 271, lamp L20 to D.C. plus. Thus indicator lamp L20 is illuminated indicating the direction of travel and the approximate position of the aircraft.

Closure of contact 202 completes a holding circuit for energized relay FR2 from D.C. plus through the coil of relay FR2, lead 263, switch 232, lead 264, contact 202, lead 21a to FIG. 2d, lead 369, contact 306, lead 22b, lead 470, contact 404/405 to ground.

Closure of contact 212 of relay FR2 completes an energizing circuit for relay TR2 from ground through contact 212, lead 272, the coil of relay TR2 to D.C. plus. However, the relay TR2 does not pull in, the relay TR2 is a delayed action relay, delayed on pull-in. The delay being adjusted to exceed the normal energization period of relay FR2.

With relay FR2 energized the part of the holding circuit for relay FR1 previously described is opened at contact 206 but energized relay DR2 closed contact 229 to supply an alternate ground source so that relay FR1 is maintained energized.

When the aircraft passes out of the beam F2 actuation of detector D2 ceases and contact 201 opens to break the energizing circuit for relay DR2. However, relay DR2, being a delayed release relay, holds in for a period of the order of one to two seconds. At termination of its delay release period relay DR2 falls out causing its controlled contacts to open. Relay DT becomes deenergized by the opening of contact 216 which relay then releases and opens its contact 72. Open contact 229 breaks the holding circuit for relay FR1 thus dropping out relay FR1. Deenergized relay FR1 opens contact 107 to extinguish indicator lamp L10 and opens contact 112 to open the energizing circuit for relay TR1, which relay, although energized did not pull in its contacts because of the delayed action of the relay.

With the aircraft proceeding along the taxi-strip it will enter beam F3 and thus actuate detector D3 which actuation will cause closure of contact 301 in FIG. 2d. Closure of contact 301 completes a circuit to energize relay DR3 from ground through contact 301, lead 315, the coil of relay DR3 to D.C. plus. Energized relay DR3 closes its contacts 319 through 326 and 329 through 331. Closure of contact 325 of relay DR3 completes a pull-in circuit for relay FR3 from D.C. plus through the coil of relay FR3, lead 363, switch 332, lead 364, lead 365, contact 325, lead 368, lead 23a to FIG. 2c to contact 203/204 to ground.

Energized relay FR3 closes its contacts 307, 302, 303/304, 311 and 312 and opens its contacts 304/305, 306, 309 and 310 and 308. Closure of contact 307 completes an illuminating circuit for indicator lamp L30 from ground via lead 371, lamp L30 to D.C. plus.

Closure of contact 302 completes a holding circuit for relay FR3 from D.C. plus through the coil of relay FR3, lead 363, switch 332, lead 364, contact 302, lead 21b to FIG. 2e, lead 469, contact 406, lead 22c, to FIG. 2f, lead 570, contact 505/504 to ground.

Closure of contact 312 of relay FR3 completes an energizing circuit for relay TR3 from ground through contact 312, lead 372, the coil of relay TR3 to D.C. plus. Relay TR3 does not pullin as it is a delayed action relay similar to relay TR2.

With relay FR3 energized the part of the holding circuit for relay FR2, previously described is opened at contact 306 but energized relay DR3 closed contact 329 to supply an alternate ground source so that relay FR2 is maintained energized.

When the aircraft passes out of beam F3 actuation of detector D3 will cease and contact 301 will open breaking the energizing circuit for relay DR3. Relay DR3 is a delayed release relay, similar to DR1 and DR2.

Upon fallout relay DR3 opens its contacts thus opening the pull-in circuit for relay FR3 at contact 325 but the relay FR3 holds in through its holding circuit. The opening of contact 329 breaks the holding circuit for relay FR2 and relay FR2 drops out. Contact 207 of relay FR2 opens to break the illuminating circuit for indicator lamp L20 thus extinguishing the lamp. Contact 212 opens to break the energizing circuit for relay TR2. It is here assumed that relay TR2 did not pull in its contacts during the time its energizing circuit was completed.

The aircraft proceeds into beam F4 causing actuation of detector D4 resulting in closure of contact 401 in FIG. 2e. Closure of contact 401 completes an energizing circuit for relay DR4 from ground via lead 415 to relay DR4. Energized relay DR4 closes its contacts 416 and 419 through 426 and 429 through 431. Closure of contact 425 completes a pull-in circuit for relay FR4 from D.C. plus, through the coil of relay FR4, lead 463, switch 432, lead 464, lead 465, contact 425, lead 468, lead 23b to FIG. 2d, contact 303/304 to ground.

Energized relay FR4 closes its contacts 407, 402, 403/404, 411 and 412 and opens contacts 404/405, 406, 409, 410 and 408. Closure of contact 407 completes an illuminating circuit for indicator lamp L40 from a ground via lead 471, indicator lamp L40 to D.C. plus.

Closure of contact 403/404 completes a circuit to energize relay FFT in termination unit T' in FIG. 2g from ground through contact 403/404, lead 23c to FIG. 2f, lead 28d to FIG. 2g, the coil of relay FFT, contact 81 to D.C. plus.

Energized relay FFT closes its contact 73 and opens its contact 74.

A branch circuit from the left side of the coil of relay FFT extends through lead 82 and the coil of relay TD' to D.C. plus. Relay TD' opens contact 81 after a time delay of five seconds, for example.

Closure of contact 402 of relay FR4 completes a holding circuit for relay FR4 from D.C. plus through the coil of relay FR4, lead 463, switch 432, lead 464, contact 402, lead 21c, lead 569, contact 506, lead 22d to FIG. 2g, contact 73 to ground.

Closure of contact 412 of relay FR4 completes an energizing circuit for relay TR4 from ground through contact 412, lead 472, the coil of relay TR4 to D.C. plus. The relay TR4 is a delayed action relay similar to relay TR3.

With relay FR4 energized part of the holding circuit for relay FR3, previously described, is opened at contact 406 but energized relay DR4 closed contact 429 to supply an alternate ground source so that relay FR3 is maintained energized.

Closure of contact 416 of relay DR4 provides an energizing circuit via lead 75, extending through FIG. 2f to the coil of relay delayed action DT' to ground in FIG. 2g. Energized relay DT' closes its contact 76 after a short delay.

When the aircraft passes out of the beam F4 actuation of detector D4 ceases and contact 401 opens breaking the energizing circuit for relay DR4. Relay DR4 is a delayed release relay so that the relay holds in for a short period, of the order of one to two seconds after the opening of the energizing circuit. With the fallout of relay DR4 its contacts open and the relay FR3 drops out, its holding circuit being opened by contact 429.

Deenergized relay FR3 opens its contact 307 which breaks the illuminating circuit for the indicator lamp L30 and opens its contact 312 which breaks the energizing circuit for relay TR3.

Proceeding forward the aircraft will enter into beam F5 causing actuation of detector D5 which causes closure of contact 501 in FIG. 2f. Closure of contact 501 completes an energizing circuit for relay DR5 from ground through contact 501, lead 515, the coil of relay DR5 to D.C. plus. Energized relay DR5 closes its contacts 519 through 526 and 529 through 531.

Closure of contact 525 completes a pull-in circuit for relay FR5 from D.C. plus through the coil of relay FR5, lead 563, switch 532, lead 564, lead 565, contact 525, lead 568, lead 23c to FIG. 2e, contact 403/404 to ground.

Energized relay FR5 closes its contacts 507, 502, 503/504, 511 and 512 and opens its contacts 504/505, 506, 509, 510 and 508. Closure of contact 507 completes an illuminating circuit for indicator lamp L50 from ground through contact via lead 571, lamp L50 to D.C. plus. Closure of contact 503/504 completes an energizing circuit from ground through contact 503/504, lead 23d, to FIG. 2g to relay FT to D.C. plus. Relay FT may be a thermal delay type relay which will open its contact 78 after a time delay of the order of several seconds for example.

Closure of contact 502 completes a holding circuit for relay FR5 from D.C. supply through the coil of relay FR5, lead 563, switch 532, lead 564, contact 502, lead 21d to FIG. 2g, contact 78 to ground. Closure of contact 512 completes an energizing circuit for relay TR5 via lead 572. Relay TR5 is a delayed relay similar to relay TR4.

With relay FR5 energized part of the holding circuit for relay FR4, previously described, is opened at contact 506 but energized relay DR5 closed contact 529 to supply an alternate ground source so that relay FR4 is maintained energized.

When the aircraft passes out of the beam F5 actuation of detector D5 ceases and contact 501 opens thus breaking the energizing circuit for relay DR5. Relay DR5 is a delayed release relay similar to relay DR4.

When relay DR5 drops out the holding circuit for relay FR4 is broken at contact 529 and relay FR4 drops out. Dropout of relay FR4 opens the illuminating circuit for indicator lamp L40 thus extinguishing the lamp.

Opening of contact 412 of relay FR4 breaks the energizing circuit for relay TR4, the relay not having pulled its contacts.

Open contact 403/404 of relay FR4 breaks the energizing circuit for relay FFT in the FIG. 2g and for thermal delay relay TD'.

Thus the aircraft has passed through the last detector beam and has been tracked by sequential illumination of the indicator lamps L10 through L50, with lamp L50 still illuminated. Now it remains to deenergize relay FR5.

Since the detector station DS5 is the last in the series of detector stations of the tracking system, the relay FR5, associated with left to right progress of aircraft along the taxi-strip must be returned to a rest condition.

This is provided for by employing a thermal time delay relay, for example, relay FT in FIG. 2g, to open a contact 78, in the holding circuit for relay FR5.

The delayed reaction of relay FT, of the order of five seconds, for example, simulates the action of the detector relay (DR series), causing release of the FR series relay FR5 in FIG. 2f, in the last detector station, without additional detector actuations, while the aircraft leaves the controlled taxi-strip, thus returning the detector station DS5 to a rest condition.

With the holding circuit for FR5 open at contact 78 the relay FR5 drops out and opens the energizing circuit for relay FT at contact 503/504.

The preferred form is here illustrated with a thermal-delay relay FT, which after having a circuit completed through its heater element will open its contact 78 after a desired time period, of the order of five seconds, for example.

Deenergized relay FR5 also opens contact 507 to extinguish lamp L50 thus returning the detector station DS5 to a rest condition.

It will be understood that additional relay assembly units may be added to the tracking assembly here shown, with the added units being similar to that illustrated particularly in FIG. 2d. Such additional relay assembly units and the associated outputs may be inserted either between relay assembly unit R2 (FIG. 2c) and R3 (FIG. 2d) or between R3 (FIG. 2d) and R4 (FIG. 2e).

Thus operation of the several cooperating relay assembly units and termination units has been described relative to response to an aircraft traveling from left to right along the controlled taxi-strip.

Let it now be assumed that the tracking system and apparatus illustrated in FIG. 2 is prepared for normal tracking of an aircraft entering from the right and traveling right to left along the taxi-strip. Such preparation is made by positioning selector switch S3 on the panel DP in FIG. 1 in its left position or, as illustrated in FIG. 2 (FIG. 2a and FIG. 2g) by positioning switches S3 and S3' to the upper position so as to energize relays RP and RP'.

Energized relay RP in FIG. 2a will close its contact 82' and energized relay RP' in FIG. 2g will close its contacts 83 and 84 and open contact 88.

Let it be assumed that an aircraft enters the taxi-strip from its right end proceeding from right to left and passes into the beam F5 and causes actuations of detector D5 resulting in energization of relay DR5 as previously described.

Closure of contact 521 of relay DR5 completes a pull-in circuit for relay RR5 from D.C. plus through the coil of relay RR5, lead 574, switch 562, lead 575, lead 576, contact 521, lead 25d to FIG. 2g to contact 83 to ground.

Energized relay RR5 closes its contacts 566, 550/551, 554, 559 and 560 and opens its contacts 551/552, 555, 556 and 557. Closure of contact 554 completes a holding circuit for relay RR5 from D.C. plus, through the coil of relay RR5, lead 574, switch 562, lead 575, contact 554, lead 26c to FIG. 2e, contact 453 of relay RR4, lead 27b to FIG. 2d, contact 351/352 of relay RR3 to ground.

Closure of contact 566 of relay RR5 completes an illuminating circuit for indicator lamp L52 from ground via lead 578, lamp L52 to D.C. plus.

Closure of contact 560 completes an energizing circuit for relay TR5 from ground through contact 560, lead 579, lead 572, the coil of relay TR5 to D.C. plus. As previously explained, relay TR5 although energized does not pull in its contacts.

As the aircraft continues along the taxi-strip it passes out of the beam F5 resulting in deenergization of relay DR5 as previously described.

Proceeding toward the left end of the taxi-strip the aircraft enters beam F4 causing energization of relay DR4 as previously described.

Closure of contact 416 completes an energizing circuit for delayed action relay DT' through a circuit previously traced.

Closure of contact 422 of relay DR4 completes a pull-in circuit for relay RR4 from D.C. plus through the coil of relay RR4, lead 474, switch 462, lead 475, lead 476, contact 422, lead 31c, to FIG. 2f to lead 25d to FIG. 2g to contact 83 to ground.

Closure of contact 421 completes an alternate pull-in circuit for relay RR4 from D.C. plus through the coil of relay RR4, lead 474, switch 462, lead 475, lead 476, contact 421, lead 25c, to FIG. 2f, contact 550/551 of relay RR5 to ground.

Energized relay RR4 closes its contacts 466, 450/451, 454, 459 and 460 and opens its contacts 451/452, 455, 456 and 457. Closure of contact 466 completes an illuminating circuit for indicator lamp L42 from ground via lead 478, indicator lamp L42 to D.C. plus.

Closure of contact 454 completes a holding circuit for relay RR4 from D.C. plus through the coil of relay RR4, lead 474, switch 462, lead 475, contact 454, lead 26b, to FIG. 2d, contact 353 of relay RR3, lead 27a, to FIG. 2c, contact 251/252 of relay RR2 to ground.

Closure of contact 460 completes an energizing circuit for relay TR4 from ground, through contact 460, lead 479, lead 472, the coil of relay TR4 to D.C. plus. Relay TR4, being a delayed pull-in relay, as previously explained does not pull in its contacts.

Energized relay RR4 breaks the series holding circuit for relay RR5 at contact 453 but energized relay DR4 through closure of contact 420 provides an alternate ground to maintain relay RR5 energized.

The indicator lamp L42 indicates the direction of travel of the aircraft and its approximate position on the taxi-strip.

The aircraft's progress exits it from the beam F4 causing deenergization of relay DR4 in the manner previously explained. Open contact 420 of relay DR4 breaks the holding circuit for relay RR5 causing relay RR5 to drop out. Contact 566 opens breaking the illuminating circuit for indicator lamp L52 thus extinguishing the lamp. Contact 560 of relay RR5 opens to break the energizing circuit of relay TR5.

Opening of contact 416 breaks the energizing circuit for relay DT', the relay DT' dropping out.

The aircraft proceeds into the beam F3 causing energization of relay DR3 through circuits previously described.

Closure of contact 321 of relay DR3 completes a pull-in circuit for relay RR3 from D.C. plus through the coil of relay RR3, lead 374, switch 362, lead 375, lead 376, contact 321, lead 25b to FIG. 2e, contact 450/451 of relay RR4 to ground.

Energized relay RR3 closes its contacts 366, 350/351, 354, 359 and 360 and opens its contacts 351/352, 353, 355, 356 and 357. Closure of contact 366 completes an illuminating circuit for indicator L32 from ground via lead 378, indicator lamp L32 to D.C. plus thus illuminating the lamp L32.

Closure of contact 360 completes an energizing circuit for relay TR3 from ground through contact 360, lead 379, lead 372, the coil of relay TR3 to D.C. plus.

Closure of contact 354 provides a holding circuit for relay RR3 from D.C. plus through the coil of relay RR3, lead 374, switch 362, lead 375, contact 354, lead 26a to FIG. 2c, contact 253 of relay RR2, lead 27, to FIG. 2b, contact 151/152 of relay RR1 to ground.

Energized relay RR3 breaks the series holding circuit for relay RR4 at contact 353 but energized relay DR3, through closure of contact 320 provides an alternate ground to maintain relay RR4 energized.

When the aircraft moves out of the beam F3 the relay DR3 becomes deenergized in the manner previously described thus opening contact 320 and breaking the holding circuit of relay RR4 thereby dropping out relay RR4.

The opening of contact 466 breaks the illuminating circuit for lamp L42 thus extinguishing the lamp. Open contact 460 breaks the energizing circuit for relay TR4.

As the aircraft proceeds further it enters the beam F2, and relay DR2 is energized as previously described.

Closure of contact 216 provides a pull-in circuit for relay DT in termination unit T, FIG. 2a, through a previously described circuit.

Closure of contact 221 provides a pull-in circuit for relay RR2 from D.C. plus through the coil of relay RR2, lead 274, switch 262, lead 275, lead 276, contact 221, lead 25a to FIG. 2d, contact 350/351 of relay RR3 to ground.

Energized relay RR2 closes its contacts 266, 250/251, 254, 259 and 260 and opens its contacts 251/252, 253, 255, 256 and 257.

Closure of contact 266 provides an illuminating circuit for indicator lamp L22 from ground via lead 278, lamp L22 to D.C. plus.

Closure of contact 260 provides an energizing circuit for relay TR2 from ground through contact 260, lead 279, lead 272, the coil of relay TR2 to D.C. plus.

Closure of contact 250/251 of relay RR2 provides a pull-in circuit for relay RRT in termination unit T, FIG. 2a, from ground through contact 250/251, lead 25, to FIG. 2b, lead 12 to FIG. 2a, the coil of relay RRT, contact 79 of relay TD to D.C. plus.

Energized relay RRT closes its contact 85 and opens its contact 86.

A branch circuit from the right side of the coil of relay RRT via line 80 to relay TD to D.C. plus provides an energizing circuit for thermal time delay relay TD which controls contact 79 in the energizing circuit for relay RRT.

Energized relay RR2 breaks the series holding circuit for relay RR3 at contact 253 but energized relay DR2, through closure of contact 220 provides an alternate ground to maintain relay RR3 energized.

Closure of contact 254 provides a holding circuit for relay RR2 from D.C. plus through the coil of relay RR2, lead 274, switch 262, lead 275, contact 254, lead 26, FIG. 2b, contact 153 of relay RR1, lead 13 to FIG. 2a, contact 85 of relay RR1 to ground.

The aircraft moves out of beam F2 resulting in deenergization of relay DR2 in the manner previously described.

Open contact 220 of relay DR2 breaks the holding circuit for relay RR3 causing it to become deenergized.

Open contact 366 breaks the illuminating circuit for indicator lamp L32 thus extinguishing the lamp. Open contact 360 breaks the energizing circuit for relay TR3.

Open contact 216 breaks the energizing circuit for relay DT.

The aircraft proceeds and passes into beam F1 and causes energization of relay DR1 as previously described.

Closure of contact 121 provides a pull-in circuit for relay RR1 from D.C. plus through the coil of relay RR1, lead 174, switch 162, lead 175, lead 176, contact 121, lead 25 to FIG. 2c, contact 250/251 of relay RR2 to ground.

Energized relay RR1 closes its contacts 166, 150/151, 154, 159 and 160 and opens its contacts 151/152, 153, 155, 156 and 157.

Closure of contact 150/151 provides a pull-in circuit for relay RT in FIG. 2a from ground through contact 150/151, lead 14 to FIG. 2a, the coil of relay RT to ground.

Relay RT is a thermal time delay type relay similar to the relay FT and will open its contact 87 after a delay of the order of several seconds, for example.

Closure of contact 166 of relay RR1 provides an illuminated circuit for indicator lamp L12 from ground via lead 178, lamp L12 to D.C. plus.

Closure of contact 154 provides a holding circuit for relay RR1 from D.C. plus throuhg the coil of relay RR1, lead 174, switch 162, lead 175, contact 154, lead 15 to FIG. 2a to contact 87 of relay RT to ground.

Energized relay RR1 breaks the series holding circuit for relay RR2 at contact 153 but energized relay DR1, through closure of contact 120 provides an alternate ground to maintain relay RR2 energized.

Closure of contract 121 of relay DR1 supplies an cuit for alarm A10 from ground in FIG. 2a through contact 86 of relay RRT, contact 82' of relay RP, lead 16 to FIG. 2b, contact 145, lead 188, alarm A10 to D.C. plus.

Energized relay RR1 causes energization of relays RT and TR1 and illumination of indicator lamp L12 as previously described.

Energized relay FR1 causes energization of relay TR1 and illumination of indicator lamp L10, as previously described.

Thus the combination of illumination of indicator lamp L10, L11 and L12 and alarm A10 sounding indicates, aircraft entering the taxi-strip traveling from left to right when the tracking system is adjusted for tracking from right to left.

The relay RR1 and FR1 will lock in through their respective holding circuits so that when relay DR1 drops out, after actuation of the detector D1 ceases, the relays RR1 and FR1 will hold in.

It may be desired, under such conditions to allow the aircraft to proceed or to direct the pilot to use an alternate taxi-strip, as desired by the control tower operator or dispatcher or other person then directing ground traffic.

Let it be assumed that the pilot is directed to exit from the taxiway immediately and use an alternate taxiway. Under such circumstances as soon as the aircraft exits form the taxi-strip it will be necessary to clear the indicator panel.

This is accomplished by manual operation of pushbutton 149 to open the holding circuit of relay ER1. With ER1 deenergized indicator lamp L11 and alarm A10 will be extinguished and deenergized respectively. Manual operation of switch 162 to its open position breaks the holding circuit for relay RR1 thus dropping out the relay RR1 which opens its contact to drop out relay RT and extinguish lamp L12.

Manual operation of switch 132 to its open position breaks the holding circuit for relay FR1 thus dropping out relay FR1 which in turn opens contacts causing lamp L10 to be extinguished.

If after the aircraft passes out of beam F1, it is desired to allow the aircraft to proceed, the relay RR1 may be dropped out by operation of switch 162 resulting in deenergization of relay RT and the extinguishing of lamp L12. Operation of the manual pushbutton 149 will provide for deenergization of alarm A10. It will be desired to maintain relay FR1 energized to provide normal operation of the relay assembly unit R2 and provide a holding circuit for relay FR2 upon its energization to provide tracking from left to right as previously described.

The relays TR1, TR2, TR3, TR4 and TR5 of the relay assemblies R1, R2, R3, R4 and R5 respectively are all delay-on-pull-in relays. The delay of the respective relay is adjusted to exceed the normal period of energization of the associated relays RR1 or FR1, RR2 or FR2, RR3 or FR3, RR4 or FR4, RR5 or FR5 respectively. As seen from the description above the period of energization of the relays of the RR series and FR series depends upon the travel time of an aircraft from the time it enters one beam, for example F1 and exits from the next beam, for example F2. Average time for normal passage between these points is ascertained and the relays of the TR series are individually adjusted to delay pull-in for that ascertained time period plus a desired margin.

It should be noted that the relays TR were associated with both the relays RR and FR so as to provide dual use of the relays TR in each of the relay assembly units.

The relays TR are provided to indicate that an aircraft has slowed down between two beams, has stopped in its travel on the taxi-strip, or has left the taxi-strip somewhere between the ends and accordingly will indicate the approximate position of slow down, stoppage or exit.

If any single relay of the RR or FR series should remain energized longer than the period of delay of the associated relay of the TR series, the relay TR will pull in its contacts and cause illumination of an indicating lamp and energization of an alarm.

Relay TR1 controls contacts 181 and 180 to illuminate lamp L11 via line 186 and energize alarm A11 via line 183 respectively.

Relay TR2 controls contacts 281 and 280 to illuminate lamp L21 via line 286 and energize alarm A21 via line 283 respectively.

Relay TR3 controls contacts 381 and 380 to illuminate lamp L31 via line 386 and energize alarm A31 via line 383 respectively.

Relay TR4 controls contacts 481 and 480 to illuminate lamp L41 via line 486 and energize alarm A41 via line 483 respectively.

Relay TR5 controls contacts 581 and 580 to illuminate lamp L51 via line 586 and energize alarm A51 via line 583 respectively.

It may occur that an aircraft enters upon the taxi-strip somewhere between the ends of the taxi-strip, as for example, between detector stations DS2 and DS3. Provision is made to indicate that such an entry upon the taxi-strip is made and to thereafter indicate the direction of travel of the aircraft.

Let it be assumed that the several relay assemblies of the tracking system and apparatus are at rest and that an aircraft enters upon the taxi-strip between the radio beams F2 and F3 and proceeds along the taxi-strip passing into beam F3, toward beam F4.

As the aircraft enters the beam F3 actuation of the detector D3 will occur resulting in closure of contact 301 and energization of relay DR3 as previously described. Since both relays RR4 and RR5 are deenergized, both relay RR3 pull-in circuits would not then be completed because of open contacts 450/451 of relay RR4 and open contact 550/551 of relay RR5.

Similarly since both relays FR2 and FR1 are deenergized both relay FR3 pull-in circuits would not be completed because of open contact 203/204 of relay FR2 and open contact 103/104 of relay FR1.

With closure of contact 331 of relay DR3 relay ER3 is energized from D.C. plus through the coil of relay ER3, lead 384, contact 331, lead 29a through FIG. 2c to FIG. 2b, contact 108 of relay FR1, lead 29' to FIG. 2c, contact 256, lead 289, contact 210, lead 30a through FIG. 2d to FIG. 2e, contact 455, contact 409, lead 35c to FIG. 2f, contact 557 to ground.

Relay ER3 closes its contact 342 to lock-in energized via line 385 and pushbutton 349; closes contact 343 to complete a pull-in circuit for relay RR3 from line 376 through contacts 343, and 323 to ground and closes contact 344 to complete a pull-in circuit for relay FR3 from line 365 through contacts 344, and 324 to ground.

Closure of contact 347 completes an illuminating circuit for indicator lamp L31 while closure of contact 345 completes a circuit to sound alarm A30 from ground through pushbutton 349, lead 385, contact 342, lead 384, contact 331, contact 345, lead 388 to alarm A30 to D.C. plus.

Energized relay RR3 causes illumination of indicator lamp L32 and energized relay FR3 causes illumination of lamp L30 as previously described.

Thus the indicator lamps L30, L31 and L32 on the panel DP are illuminated with alarm A30 sounding indicating an aircraft has entered upon the taxi-strip, in the middle of the strip and has entered beam F3. However, the direction of travel of the aircraft is not now indicated as the aircraft may have entered between radio beams F3 and F4 or F2 and F3 as assumed.

As the aircraft proceeds, as assumed to the right along the taxi-strip it will exit from beam F3 and relays FR3 and RR3 will lock in through circuits previously described. When the aircraft enters beam F4 actuation alternate holding circuit for relay RRT from D.C. plus through contact 79, the coil of relay RRT, lead 12 to FIG. 2b, contact 121, lead 176, contact 154, lead 15 to FIG. 2a, contact 87 to ground.

Closure of contact 160 of relay RR1 completes an energizing circuit for relay TR1 from ground through contact 160, lead 179, lead 172, the coil of relay TR1 to D.C. plus.

As the aircraft proceeds out of the beam F1, the relay DR1 thereafter becomes deenergized as previously described.

Open contact 120 breaks the holding circuit for relay RR2 thus deenergizing relay RR2.

Open contact 266 of relay RR2 breaks the illuminating circuit for lump L22 thus extinguishing the lamp L22.

Open contact 260 breaks the energizing circuit for relay TR2 thus deenergizing the relay TR2.

Open contact 250/251 breaks one of the holding circuits for relay RRT while open contact 121 breaks the alternate holding circuit thus causing deenergization of relay RRT.

Thus the aircraft has proceeded along the length of the taxiway and exits therefrom.

After a time period the thermal delay relay RT opens its contact 87 and this opens the holding circuit for relay RR1. Thus relay RR1 drops out.

Open contact 166 breaks the illuminating circuit for indicator lamp L12 thus extinguishing the lamp.

Open contact 150/151 breaks the holding circuit for relay RT and thus deenergized relay RT.

Open contact 160 breaks the energizing circuit for relay TR1 and the relay becomes deenergized.

Thus in the absence of additional aircraft proceeding along the taxi-strip all relays and indicator lamps return to their normal deenergized condition except for relays RP and RP' which are controlled by the manual switch as described above.

Provision is also made to indicate that an aircraft has entered upon the taxi-strip from the righthand end, for example, when the selector switch S3 has been positioned for accepting and tracking aircraft entering and traveling from left to right.

Let it now be assumed that the tracking system is adjusted for the tracking of aircraft traveling inbound, or from left to right, along the taxi-strip and an aircraft enters and proceeds along the taxi-strip traveling outbound, or right to left from the right hand end.

With switch S3 in FIG. 1 in its rightmost position (or switch S3 in FIG. 2a and S3' in FIG. 2g in its bottom position) relays FP and FP' will both be energized and will close normally open contacts 68 and 69 and 70 respectively.

As the aircraft enters the taxi-strip from the right hand end and proceeds into beam F5 relay DR5 will become energized.

Closure of contact 531 will complete a circuit to pull in relay ER5 from D.C. plus through the coil of relay ER5, lead 584, contact 531, lead 598 to FIG. 2g, contact 70 of relay FP', contact 74 of relay FFT to ground.

Closure of contact 542 by relay ER5 completes a holding circuit for relay ER5 from D.C. plus through the coil of relay ER5, contact 542, lead 585, pushbutton 549 to ground.

Closure of contact 543 completes a pull-in circuit for relay RR5 from the D.C. plus through the coil of relay RR5, lead 574, switch 562, lead 575, lead 576, contact 543, contact 523 of relay DR5 to ground.

Closure of contact 544 by relay ER5 completes a pull-in circuit to energized relay FR5 from D.C. plus through the coil of relay FR5, lead 563, switch 532, lead 564, lead 565, contact 544, contact 524 of relay DR5 to ground.

Closure of contact 547 by relay ER5 completes an illuminating circuit for indicator lamp L51 from D.C.

supply through lamp L51, lead 586, contact 547 to ground.

Closure of contact 545 completes a circuit to operate alarm A50 from D.C. plus through alarm A50, lead 588, contact 545, lead 598, to FIG. 2g, contact 70 of relay FP', contact 74 of relay FFT to ground.

Energized relay FR5 closes contact 507 to cause illumination of lamp L50; contact 502 to provide a lock-in circuit through contact 78; contact 503/504 to energized thermal delay relay FT; and contact 512 to energized delayed action relay TR5.

Energized relay RR5 closes contact 566 to cause illumination of indicator lamp L52; contact 554 to complete a lock-in circuit for relay RR5 as previously described; and contact 560 to complete a second energizing circuit for delayed action relay TR5.

Thus the combination of indicator lamp L50, L51 and L52 illuminated and alarm A50 sounding indicates entrance of an aircraft from the wrong direction as that set by adjustment of switch S3.

The dispatcher or other person in charge of ground traffic may permit the aircraft to continue and adjust switch S3 to its opposite position and after the aircraft passes out of beam F5 may operate pushbutton 549 to open the holding circuit for relay ER5 thus dropping out relay ER5 and extinguishing indicator lamp L51 and turning off alarm A50 and may operate switch 532 to open the holding circuit for relay FR5 dropping out relay FR5 thus causing lamp L50 to be extinguished and relay FT to become deenergized.

Thus the aircraft proceeding along the taxi-strip to the left will now be tracked as previously described although the aircraft has entered the taxiway counter to the originally established direction.

On the other hand the aircraft may be directed to turn around and leave the taxi-strip and use an alternate taxi-strip. Under such condition the indicator lamps and alarm may be cleared by opening switches 562 and 532 and pushbutton 549 thus opening the holding circuits for relays RR5, FR5 and ER5 respectively after the aircraft has left the beam F5. Thus the relay assembly unit R5 will return to its rest condition.

Let it now be assumed that the tracking system is adjusted for the tracking of aircraft traveling outbound, or from right to left, along the taxi-strip and an aircraft enters and proceeds along the taxi-strip traveling inbound, or left to right.

As previously stated, the relay RP and RP' will be energized via switches S3 and S3' and will close contact 82' and contacts 83 and 84 and open contact 88 respectfully thus providing for normal tracking of an aircraft traveling from right to left.

As the aircraft enters into beam F1 from the left end of the taxi-strip, proceeding toward the right end, energization of relay DR1 will result as previously described.

Closure of contact 131 will complete a pull-in circuit for relay ER1 from D.C. plus through the coil of relay ER1, lead 184, contact 131, lead 16 to FIG. 2a, contact 82' of relay RP, contact 86 of relay RRT to ground.

Energized relay ER1 closes its contacts 142, 143, 144, 145 and 147. Closure of contact 142 provides a lock-in circuit for relay ER1 from D.C. plus through the coil of relay ER1, contact 142, lead 185, manual pushbutton 149 to ground. Closure of contact 147 provides an illuminating circuit for indicator lamp L11 from ground via lead 186, lamp L11 to D.C. plus.

Closure of contacts 123 and 143 provides a pull-in circuit for relay RR1 from D.C. plus through the coil of relay RR1, lead 174, switch 162, lead 175, lead 176, contact 143, contact 123 to ground.

Closure of contacts 144 and 124 provide a pull-in circuit for relay FR1 from D.C. plus through the coil of relay FR1, lead 163, switch 132, lead 164, contact 144, contact 124 to ground.

Closure of contact 145 provides an energizing cirof detector D4 and energization of relay FR4 will result through a pull-in circuit including contact 303/304 of relay FR3 as previously described.

Energized relay FR4 will cause illumination of indicator lamp L40 thereby indicating that the aircraft is proceeding toward the right along the taxi-strip. Relay FR3 and lamp L30 will become deenergized as previously described but relay RR3 and ER3 will hold energized until released by operation of switch 362 and pushbutton 349 to open the respective holding circuits.

As the aircraft continues along the taxi-strip normal tracking will continue as previously described.

If the aircraft had entered upon the taxi-strip between beams F3 and F4 and had proceeded toward the left end of the taxi-strip the relay RR2 would have been energized after its entrance into beam F2 and the relay FR2 and ER2 would have been held deenergized. Energized relay RR2 would cause illumination of indicator lamp L22 and would thus indicate that the aircraft was proceeding to the left along the taxi-strip. Relay RR3 and lamp L32 would become deenergized and leave relays FR3 and ER3 energized until released by operation of the switch 332 and pushbutton 349 to open the respective holding circuit. Normal tracking of the aircraft then proceeding to the left would continue.

Thus actuation of one of the intermediate detector stations illustrated by DS3 without a history of actuation of any of the two detection stations to the left or of the two detection stations to the right will operate the associated ER relay, the associated alarm and the three indicator lamps associated with that station. The ER relay is operated by a series circuit through break contacts on the FR relay in the second station to the left and the RR relay in the second station to the right and both the FR and RR relays in the immediately adjacent stations to the right and left.

In the next to the last detector station such as DS2 and DS4 an actuation of that station without past history in the established direction is treated as a failure of actuation of the preceding detector station such as DS1.

As to the next to the end detector station the actuation without past history is treated somewhat differently.

At station DS2, for example, with switch S3 set for left to right operation an actuation of detector D2 without actuation of detector D1 and detector D3, this is treated as a failure or lack of actuation of detector D1 as more fully described below.

Similarly with switch S3 set for right to left operation an actuation of D4 without a past history of actuation in adjacent detector stations is treated as a failure or lack of response of detector D5.

In the case of relay ER2 the break contact of the FR relay in the second detector station to the left is replaced by a break contact 89 of relay FP in the terminating unit in FIG. 2a so that the operation of the alarm A20 and the three indicator lamps by ER2 is permitted in the right to left setting of switch S3 but prevented in the left to right setting of switch S3.

Similarly the circuit of relay ER4 of DS4 has the break contact of the RR relay of the second station to the right replaced by break contact 88 of relay RP' in the terminating unit of FIG. 2g.

Therefore such operation of the alarm A40 and three indicator lamps by ER4 is prevented in the right to left direction but is permitted in the left to right direction.

It may occur that due to electrical failure or failure of one of the components, one detector station fails to respond to actuation. Provision is made in the tracking apparatus to respond in an otherwise normal condition when one detector station fails to respond to actuation so long as the detector station on both sides of the failed detector station respond normally to actuations of an aircraft. This condition may be referred to as a "skipped detector station."

Let it now be assumed that one of the detector stations for example DS3, fails to respond to actuation by an aircraft passing through the beam, F3, of its detector D3. The reaction within any detector station so failing is similar to the reaction to be described for DS3 except for failure of the first or the last detector station in the selected direction.

Entry on to the taxi-strip at the left end, passage through beams F1 and F2 and the resulting response of detector stations DS1 and DS2 will be as previously explained with reference to normal operation and tracking of an aircraft traveling from left to right along the taxi-strip.

Let it further be assumed that the aircraft has passed through and out of the beam F2 and relay FR2 is held in maintaining indicator lamp L20 illuminated through circuits previously described.

As the aircraft proceeds into the beam F3 of detector D3 the detector station fails to respond to the actuation. Thus the relays DR3 and FR3 remain deenergized and the lamp L30 remains extinguished.

As the aircraft proceeds forward and passes out of beam F3 and subsequently into beam F4, actuation of detector D4 causes energization of relay DR4 as previously described.

Closure of the contacts of relay DR4 completes a pull-in circuit for relay FR4 from D.C. plus through the coil of relay FR4, lead 463, switch 432, lead 464, lead 465, contact 426, lead 28b to FIG. 2d, lead 23a to FIG. 2c, contact 203/204 to ground. Thus it may be seen that this last described pull-in circuit by-passes the contacts of the now deenergized relay FR3.

Energized relay FR4 closes and opens its contacts as previously described resulting in illumination of lamp L40.

Closure of contact 412 completes a circuit for energization of relay ER3 from D.C. plus through the coil of relay ER3, lead 384 to FIG. 2c, contact 211, lead 33a through FIG. 2d to FIG. 2e, lead 479, contact 412 to ground.

Energized relay ER3 closes its contacts 342, 343, 344, 345 and 347.

Closure of contact 342 completes a lock-in circuit for relay ER3 as previously described.

Closure of contact 347 completes an illuminating circuit for indicator lamp L31 as previously described.

The alarm A30 generally associated with relay ER3 is not operated due to open contacts 210 and 409 which are in its energizing circuit.

Thus it will be seen that indicator lamps L20 and L40 are illuminated via relays FR2 and FR4 respectively thereby indicating the direction of travel of the aircraft and indicator lamp L31 is illuminated via relay ER3 thereby indicating that detector station DS3 failed to respond to actuation with detector station DS2 having normally responded to actuation.

Upon energization of relay FR4 part of the series holding circuit for relay FR2 was opened at contact 404/405 but energized relay DR4 closed contact 430 to supply an alternate ground to maintain relay FR2 energized.

Upon deenergization of relay DR4 and release of contact 430 relay FR2 drops out thus extinguishing indicator lamp L20.

As the aircraft proceeds through subsequent detector beam of subsequent detector station normal tracking of the aircraft follows.

Relay ER3, having locked in, may be released after relay FR2 drops out by operation of manual pushbutton 349 thus the relay ER3 will drop out and release indicator lamp L31.

If the first detector station should fail to respond to actuation, as for example DS1, the aircraft will pass through beam F1 without response from DS1. Upon entry into beam F2 relay DR2 will pull in and complete a pull-in circuit for relay FR2 from lead 265 through contact 226, lead 28 to FIG. 2b to lead 11 to FIG. 2a, contact 68 of relay FP to ground. Relay ER2 does not pull in because of open contact 89 of relay FP in its pull-in circuit. Closure of contact 216 by relay DR2 causes energization of relay DT in FIG. 2a thus completing a pull-in circuit for relay ER1 from D.C. plus, through the coil of relay ER1, lead 184, lead 17 to FIG. 2a, contact 69 of relay FP, contact 72 of relay DT, lead 18 to FIG. 2b, contact 155 of RR1, contact 199 of FR1, lead 35 to FIG. 2c to contact 257 to ground. Relay ER1 locks in through its contact 142 and causes illumination of lamp L11. Alarm A10 does not pull in because of open contact 131 of relay DR1. Progress of the aircraft is tracked at it continues along the taxi-strip while lamp L11 is held until relay ER1 is released.

It should be noted that reaction similar to that just described for failure of response by DS1 would occur if switch S3 is set for left to right operation and an aircraft enters the taxi-strip between beams F1 and F2 and actuates F2 without actuating F1, or an aircraft enters the taxi-strip between beams F2 and F3 and actuates beam F2.

In the latter case the aircraft would be traveling in the prohibited direction, however this would be ascertained only upon the entrance into beam F1 which would result in actuation of DR1 while ER1 is held energized. With DR1 and ER1 both energized relay RR1 and FR1 would be pulled in through contacts 143 of ER1 and 123 of DR1 for relay RR1 and through contacts 144 of ER1 and 124 of DR1 for relay FR1.

Thus with relays RR1, DR1 ER1 and FR1 energized alarm A10 would be sounded and lamps L10, L11 and L12 in FIG. 2b would be illuminated along with lamp L20 in FIG. 2c thus indicating the passage of the aircraft from right to left after entering between F2 and F3.

If failure of the last detector station should occur, as for example DS5, since there are no additional detector beams to pass through, after the last beam F5 there is no visible reaction relative to DS5 except that there is no indicator lamp illuminated by DS5.

The relay FR4 of FIG. 2e must be returned to a deenergized condition and this is accomplished by action of the thermal time delay relay TD' in FIG. 2g. After a time period slightly to excess of the normal travel time necessary for travel from beam F4 through beam F5, relay TD' opens its contact 81. Relay TD' and FFT became energized via closure of contact 403/404 of FR4 in FIG. 2e, through circuits previously described. With relay FFT energized relay FR4 locks in via contact 73 of FFT in FIG. 2g. When TD' opens contact 81, the relay FFT drops out. Upon drop out of relay FTT its contact 73 opens thereby breaking the holding circuit of FR4 in FIG. 2e, thus returning DS4 in FIG. 2e to rest and restoring relays FFT and TD' of FIG. 2g to a deenergized condition.

Let it now be assumed that the tracking system and apparatus is adjusted, by selector switch S3, for tracking aircraft traveling from right to left along the taxi-strip, and one of the detector stations, as for example DS3, being inoperative becomes a skipped detector station.

Let it also be assumed that an aircraft enters upon the taxi-strip from its right end traveling toward the left end and proceeds along the taxi-strip passing through beam F5 with the resulting operation of relays DR5 and RR5 and outputs associated with relay assembly unit R5 as previously described, and passes out of beam F5 and into beam F4 causing reaction in DS4 as previously described.

When the aircraft passes out of beam F4, as previously explained, relay RR4 will remain energized with indicator lamp L42 illuminated.

When the aircraft passes into beam F3 of detector station DS3, the detector station DS3, being assumed inoperative, fails to react to actuation by the aircraft, thus the relays of relay assembly unit R3 remain deenergized while relay RR4 is held energized.

Proceeding further to the left the aircraft enters the beam F2 resulting in energization of relay DR2, FIG. 2c, through a circuit previously described.

Closure of contact 219 by relay DR2 supplies an alternate ground for the relay RR4 holding circuit via lead 27a, as previously described, in place of contact 251/252 of relay RR2.

Closure of contact 222 completes a pull-in circuit for relay RR2 from D.C. plus through the coil of relay RR2, lead 274, switch 262, lead 275, lead 276, contact 222, lead 31a through FIG. 2c to FIG. 2d, lead 25b, contact 450/451 to ground.

Relay RR2 locks in through a holding circuit previously described.

Closure of contact 259 completes a pull-in circuit for relay ER3 from D.C. plus through the coil of relay ER3, lead 384, lead 32a to FIG. 2c, lead 291, contact 259 of relay RR2, lead 292, lead 33a through FIG. 2d to FIG. 2e contact 460 of relay RR4 to ground.

Energized relay ER3 closes its contacts and locks in through a circuit previously described. Indicator lamp L31 is illuminated as previously described.

The alarm A30 energizing circuit is now open at contact 331 of relay DR3 thus assuring that alarm A30 will remain inoperative.

Thus indicator lamps L42 and L22 of DS4 and DS2 respectively are illuminated by action of relays RR4 and RR2 respectively while indicator lamp L31 is illuminated via action of relay ER3 with indicator lamps L30 and L32 remaining extinguished due to relays FR3 and RR3 remaining deenergized.

Indicator lamps L42 and L22 indicate the direction of travel of the aircraft while indicator lamp L31 indicates detector station DS3 has failed to operate normally thus indicating a skipped detector station.

Upon deenergization of relay DR2 the holding circuit of relay RR4 will be opened at contact 219 and relay RR4 will drop out causing lamp L42 to be extinguished.

Relay ER3 will remain locked in until the pushbutton 349 is operated to open the holding circuit for the relay thus deenergizing the relay and causing the lamp L31 to be extinguished.

The aircraft proceeding along the taxi-strip will pass through subsequent beams associated with other detector stations which will respond to such passage as previously described.

If the first detector station should become a skipped detector station, as for example DS5, the aircraft will pass through beam F5, without response from DS5. Upon entry into beam F4, relay DR4 will pull in and complete a pull-in circuit for relay RR4 in FIG. 2e from lead 476, contact 422, lead 31c to FIG. 2f, lead 25d to FIG. 2g, contact 83 of relay RP' to ground. Relay ER4 does not pull in because of open contact 88 of relay RP' in its pull-in circuit in FIG. 2g.

Closure of contact 416 by relay DR4 causes energization of relay DT' in FIG. 2g thus completing a pull-in circuit for relay ER5 from D.C. plus through the coil of relay ER5, lead 584, lead 29d, which follows through to FIG. 2g, loops out of FIG. 2g into FIG. 2f, follows through FIG. 2f to FIG. 2e, through contact 408 of relay FR4, lead 29'c to FIG. 2f, contact 556 of relay FR5, lead 589, contact 510 of relay FR5, lead 30d to FIG. 2g, contact 84 of relay RP', contact 76 of relay DT' to ground.

Relay ER5 locks in through its contact 542 and causes illumination of indicator lamp L51. Alarm A50 is held inoperative because of open contact 531 of relay DR5.

Progress of the aircraft is tracked as it continues along the taxi-strip while lamp L51 is held illuminated until relay ER5 is released by operation of pushbutton 549.

Reaction similar to that just described for skip of detector DS5 would occur if an aircraft entered the taxi-strip between the beams F4 and F5 and actuates F4 without actuating F5 or an aircraft enters the taxi-strip between beams F4 and F3 and actuates F4.

In the latter case the aircraft would be traveling in the prohibited direction, however, this would be ascertained only upon the entrance of the aircraft into beam F5 which would result in actuation of DR5 of DS5 while ER5 is held energized.

With DR5 and ER5 both energized the relays FR5 and RR5 would be pulled in through contact 543 of ER5 and 523 of DR5 for relay RR5 and contacts 544 of ER5 and 524 of DR5 for relay FR5.

Thus with relays RR5, DR5, ER5 and FR5 energized alarm A50 would be sounded and lamps L50, L51 and L52 in FIG. 2f would be illuminated along with lamp L40 in FIG. 2e, thus indicating the passage of the aircraft from right to left after entering the taxi-strip between beams F3 and F4.

If failure of the last detector station should occur, as for example DS1 in the right to left direction, since there are no additional detector beams to pass through, after the last beam F1, there is no visible reaction relative to DS1, except that there is no indicator lamp illuminated by DS1.

The relay RR2 of FIG. 2c must be returned to a deenergized condition and to accomplish this a thermal time delay relay TD in FIG. 2a is provided to open its contact after a time period. The delay of TD is preferably slightly longer than the normal travel time necessary for travel from beam F2 through beam F1.

Relay TD and RRT became energized via closure of contact 250/251 of relay RR2 in FIG. 2c through circuit previously described. When after the time delay relay TD opens its contact 79 the relay RRT drops out and releases its contact 85 in the holding circuit for relay RR2. Relay RR2 drops out and opens its contacts 250/251 thereby opening the holding circuit for relays RRT and TD. Thus detector station DS2 is returned to rest and relays RRT and TD of FIG. 2a are returned to a deenergized condition.

It should be understood that corresponding circuitry may be readily traced for the skipping of detector stations DS4 and DS2.

Thus the failure of actuation or skipping of a single intermediate detector station with proper actuation of adjacent detector stations on both sides thereof will be indicated by the display of the bar indicator lamp alone for the skipped station by energization of its associated ER relay (of the series ER3 etc.), through a circuit in series through front contacts of the FR relays of the adjacent stations on both sides of the skipped station or in series through front contacts of the RR relays of such adjacent stations.

A corresponding skipping of a leading end station, i.e. DS1 in the left to right direction setting or DS5 in the right to left direction setting, is similarly indicated by operation of its ER relay by circuitry including front contacts of relays in the terminating unit in place of the absent detection station, but skipping of a trailing end station, i.e. the last detection station in the set direction, is disregarded, the directional relay and indicator of the next to last station being released by time delay relay action in the terminating unit as described above.

In the description above of normal tracking of an aircraft traveling from right to left along a taxi-strip, it has been seen that with switches S10, S20, S30, S40 and S50 open, as illustrated in FIG. 2 the lock-in circuits or holding circuits for the RR series relays, except for relay RR1 and RR2 extend into and pass through contacts of the two next succeeding relay assembly units of the two next succeeding detector stations, in the right to left direction, to a ground connection.

Relay RR2 of relay assembly R2, holding circuit extends through the next succeeding relay assembly R1, and into the termination unit T to a ground connection while relay RR1 of relay assembly unit R1, holding circuit extends into termination unit T to a ground connection.

Reviewing the holding circuit of relay RR5, which is typical of relays RR4 and RR3, it was seen that the holding circuit for relay RR5 of relay assembly unit R5, for example, extends through relay assembly unit R4, including back contact 453 of relay RR4 and into relay assembly unit R3, including back contact 351/352 of relay RR3 in the holding circuit. Completion of this holding circuit is dependent upon relays RR4 and RR3 being deenergized.

Thus if relay RR3 is energized through actuation of an aircraft contact 453 will be open to prevent completion of the holding circuit of relay RR5, and if relay RR3 is energized through actuation of an aircraft, contact 351/352 will be open to prevent completion of the holding circuit of RR5.

Thus to maintain normal operation of the tracking system and apparatus, at least a minimum spacing between aircraft must be maintained, the space equal to the distance between the detector points F5 and F3.

Minimum spacing between aircraft traveling in the right to left direction may be reduced by either reducing the distance between the detection points or by connecting switch S10, S20 and S30 to ground. The switches S40 and S50 are ineffective in the circuitry as illustrated.

By positioning switches S10, S20 and S30 to connect with the ground terminal, a ground connection is provided to shunt the last contact in the holding circuit of the relays RR3, RR4 and RR5 respectively thus substantially reducing the extension of the holding circuit for the relays RR3, RR4 and RR5 to the next succeeding relay assembly unit only.

For example, the holding circuit of the relay RR5 would follow through its contact 554, back contact 453 of relay RR4 to ground through switch S30. In this form the holding circuit of relay RR5 is dependent upon deenergization of relay RR4. Thus the relay RR5 may hold locked in even though the relay RR3 is energized so long as relay RR4 is deenergized.

This provides for normal operation of the tracking system and apparatus with a minimum distance between aircraft equal to or more than the distance between the exit edges of two detection points, such as F5 and F4, for example.

In the description of normal tracking of an aircraft traveling from left to right along a taxi-strip, it has been seen that with the switches S11, S21, S31, S41 and S51 open, as illustrated in FIG. 2, the lock-in circuits or holding circuits for the FR series relays, except for relays FR4 and FR5, extend into and pass through contacts of the two next succeeding relay assembly units of the two next succeeding detector stations, in the left to right direction to a ground connection.

The relay FR4 holding circuit extends through the next succeeding relay assembly and into the termination unit T' to a ground connection while the relay FR5 holding circuit extends into the termination unit T' to a ground connection.

Reviewing the holding circuit for the relay FR1, which is typical of the relays FR2 and FR3, it was seen that the holding circuit for relay FR1 of relay assembly R1, for example, extends through relay assembly R2, including back contact 206 of relay FR2 and into relay assembly R3 including back contact 304/305 of relay FR3 in the holding circuit. Completion of this holding circuit to ground is dependent upon the relays FR2 and FR3 being deenergized.

Thus if relay FR2 is energized through actuation of an aircraft contact 206 will be open to prevent completion of the holding circuit of relay FR1 and if relay FR3 is energized through actuation of an aircraft contact 304/305 will be open to prevent completion of the holding circuit of FR1.

Thus at least a minimum spacing between aircraft must be maintained to provide normal operation of the tracking system and apparatus. This minimum spacing is equal to the distance between the detection points or barriers in the tracking system.

Minimum spacing between aircraft traveling in the left to right direction may be reduced by either reducing the distance between the detection points or by connecting the switches S31, S41, and S51 to ground. The switches S11 and S21 are ineffective in the circuitry as illustrated, except for minor changes in the relay assembly unit circuitry, specifically, the inclusion of contacts 216 and 416 in relay assembly units R2 and R4 respectively connected to termination units T and T' respectively, the circuitry of the relay assembly units R2, R3 and R4 is the same.

By positioning switches S31, S41 and S51 to connect with the ground terminal, a ground connection is provided to shunt the last contact in the holding circuit of the relays FR1, FR2 and FR3 respectively thus substantially reducing the extension of the holding circuit for the relays FR1, FR2, and FR3 to the next succeeding relay assembly unit only.

For example, the holding circuit of the relay FR1 would follow through its contact 102, contact 206 of relay FR2 to ground through switch S31. In this form the holding circuit of relay FR1 is dependent upon deenergization of relay FR2 only.

Thus with the switches S31, S41 and S51 connected to ground the relays FR1, FR2 and FR3 respectively may hold locked in even though the relay of the FR series in the relay assembly once removed is energized so long as FR series relay of the adjacent unit is deenergized. Thus normal operation of the tracking system may be maintained with a minimum distance between aircraft equal to or more than the distance, between the exit edge of two detection points F2 and F3 for example.

It should be understood that if it is desired to provide a tracking system and apparatus including more than five detector stations additional detector stations similar to that illustrated in FIG. 2d, detector station DS3 may be interposed either between detector station, DS3, FIG. 2d and detector station DS2, FIG. 2c or between detector station DS3 and detector station DS4, FIG. 2e with interconnecting circuits substantially the same as illustrated in FIG. 2d.

With the indicator lamps L10, L20, L30, L40 and L50 in the form of arrows directed to the right and L12, L22, L32, L42 and L52 in the form of arrows directed to the left and L11, L21, L31, L41 and L51 in the form of a bar, for example, the several sequences and combinations of the indicator lamps illuminated on the panel DP will indicate the pattern of aircraft travel to any observer without the necessity of observing aircraft activity itself.

The panel DP may for example include a lay-out of all the concrete or other type runways and taxi-strips of the airport with indicator lamps on such lay-out at positions approximating the positions of the detection points or radio beams or barriers.

Obviously each individual taxi-way may include a separate and individual tracking system with or without a signal control system as desired or connecting taxi-ways may have a combined system connected to operate as one tracking system.

The switch S3 is provided with a neutral position so as to maintain the relays RP and FP of termination unit T, FIG. 2a and relays RP' and FP' of termination unit T', FIG. 2g, deenergized and provide a somewhat other than normal indication of aircraft entry onto the taxi-strip.

The departure from the combination of indicator lamp illumination described above is justified by the fact that the combination of lamp illuminations will appear at the same position on the panel DP and since the tracking system and apparatus will be positioned for neutral operation, the observer will be aware of the setting for such condition.

Let it be assumed that the switches S3 in termination units T and T' are in the neutral position as indicated, and that an aircraft enters from the left end of the taxi-strip proceeding to the right along the taxi-strip As the aircraft passes into the beam F1 actuation of detector D1 will result in energization of relay DR1 as previously described. However, the relays FR1 and RR1 remain deenergized because of open contact 68 in the pull-in circuit of FR1 and open contacts 250/251 of RR2 and 350/351 of RR3 in the pull-in circuits of RR1. The relay ER1 also remains deenergized because of open contact 82' in FIG. 2a.

The relay DR1 becomes deenergized after the aircraft exits from the beam F1. Upon its entry into beam F2 relay DR2 becomes energized but relays FR2 and RR2 remain deenergized due to failure of completion of their respective pull-in circuits. The relay ER2 becomes energized through its previously traced pull-in circuit and locks in as previously described. Indicator lamp L21 is illuminated and alarm A20 is energized from ground through pushbutton 249, lead 285, contact 242, lead 284, contact 231, contact 245, lead L88 to A20 to D.C. plus. Closure of contacts 243 and 244 provide completion of the pull-in circuits for relays RR2 and FR2 and thus cause illumination of lamps L22 and L20 respectively.

Under such conditions the indicator lamps L20, L21 and L22 and alarm A20 associated with detector station DS2 on panel DP will be illuminated and sounding respectively. This indicates the presence of the aircraft in beam F2 and as the aircraft proceeds out of beam F2 and into beam F3 normal tracking procedure will occur as previously described.

It will be noticed that under these conditions detector station DS1 failed to indicate the presence of the aircraft, on the panel and detector station DS2 caused illumination of the three indicator lamps. This combination of indicator lamps is similar to that described for entrance of an aircraft somewhere in the interim in section of the taxi-strip. However, knowledge that the selector switch S3 is in a neutral position and visual indication of the three indicator lamps of detector station DS2, indicates that an aircraft passed through the beam F1 and the detector station failed to completely respond or an aircraft by-passed the beam F1 producing a similar response as here described.

The response of the detector stations DS5 and DS4 for an aircraft entering the taxi-strip from the right hand end would be similar to that just described for the response of detector stations DS1 and DS2 except the detector station DS5 would fail to respond and detector station DS4 would cause illumination of the three indicator lamps L40, L41, L42 and sound alarm A40.

Referring now to FIG. 3, the preferred embodiment of the signal control circuits that may be associated with the aircraft tracking system or apparatus, is presented, partly in block and partly in schematic circuit form, including a schematic presentation of the light relays, signal lighting circuits and signals, for control of signals displayed to aircraft proceeding along the taxi-strip in one direction, from left to right for example.

Across the top of the drawing are eleven blocks consecutively labeled RT', FR1', FR2', FR3', FR3'a, FR3'b, FR3'c, FR3'd, FR4', FR5' and FT'. These blocks represent repeater relays of, for example, relay RT in the termination unit, T, RT'; relay FR1 in relay assembly R1, FR1'; relay FR2 in R2, FR2'; relay FR3 in R3, FR3'; relay FR4 in R4, FR4', relay FR5 in R5, FR5'; and relay FT in termination unit T', FT'. The relays FR3'a, FR3'b, FR3'c and FR3'd represent repeater relays of the FR series of four interposed relay assemblies of four interposed detector stations which are here assumed to be inserted into the tracking system and apparatus between of the relay that is repeated. The relays RT' and FT'

FR2' etc. may be connected in parallel with the relay it is repeating or may be energized through a circuit in which there is a source of current, a ground connection and a normally open contact that is closed upon energization of the relay that is repeated. The relays RT' and FT' would preferably be connected in parallel with the relay they individually repeat, relays RT and FT respectively, so that relays RT' and FT' pull in without the time delay associated with relays RT and FT.

The said relays RT', FR1', FR2', etc, are illustrated deenergized with their respective contacts arranged below the relay by which the contacts are controlled. In broken line box LC1 the relays LG1 and LR1 represent the light relays which control, for example, illumination of a set of signal lamps S5, which set of signal lamps is also illustrated in FIG. 1 associated with detector station DS1.

The switch S1, surrounded by a broken line box represents the manual switch S1 illustrated on panel DP in FIG. 1. This switch is provided for optional illumination of signal S5 in its rest condition so that the signal S5 may be illuminated red (R) at rest, or when both relays LG1 and LR1 are deenergized, with the switch S1 in its lower-most position or, when adjusted to its next position upward, will rest without an illuminated signal or, when adjusted to its uppermost position, as illustrated, will rest green (g).

The blocks LC2, LC3, LC3a, LC3b, LC3d and LC4 represent in block form, the combination of two light relays, the lighting circuits and the signals represented in circuit form by the relays LGc and LRc, their respective contacts, the light circuits, the switches SWBc and SWc and the three lamps of signal S7c, in broken line block LC3c.

The block LC2 may include, for example light relays LG2 and LR2, switches SW2 and SWB2, the circuits for lamp illumination and a set of signals S6, associated with detector station DS2 in FIG. 1. Relays LG2 and LR2 and switches SW2 and SWB2 correspond respectively with relays LGc and LRc and switches SWc and SWBc. Block LC3 may include corresponding relays LG3 and LR3, switches SW3 and SWB3, lamp illuminating circuits and a set of signals S7, associated with detector station DS3 in FIG. 1. Blocks LC3a, LC3b and LC3d include similar corresponding components as for example relays LGa and LRa, LGb and LRb and LGd and LRd respectively, each switches SWa and SWBa, SWb and SWBb, SWd and SWBd respectively and each set of signals S7a, S7b and S7d with the illuminating circuits. Block LC4 likewise represents in block form similar corresponding components that may be, for example, relays LG4 and LR4, switches SW4 and SWB4, lamp illuminating circuits and a set of signals S8 associated with the detector station DS4 illustrated in FIG. 1.

The signals S7a, S7b, S7c and S7d would be respectively interposed in the tracking system and apparatus and associated with the interposed detector stations between DS3 and DS4.

To prevent overcrowding of the drawing, one complete light relay assembly in broken line box LC3c, is presented in circuit form, this light relay assembly being typical of other light relay assemblies that may be employed in the control system except for the light relay assembly LC1.

As previously mentioned, the signal control circuits and the associated light relays, the illuminating circuits and set of signals of FIG. 3 may be employed, in association with the tracking system and apparatus for control of the signals particularly displayed to aircraft traveling from left to right, for example, along the taxi-strip or runway.

To provide signal control circuits and associated light relays and signals for display to aircraft traveling from right to left, for example, the relay designations RT', FR1', FR2' etc. would be changed so that reading from left to right the relays would be FT', RR5', RR4' RR3'd, RRD'c, RR3'b, RR3'a, RR3', RR2', RR1' and RT', then by reversing the relays and circuitry of FIG. 3, left to right, in mirror image, relays and circuitry may be obtained for control of aircraft traveling from right to left along the taxi-strip. The switch S1 will be changed to S2 and signals S5, S6, S7, S7a, S7b, S7c, S7d, and S8 would become S15, S16, S17, S17a, S17b, S17c, S17d and S18 respectively.

For convenience of description the signals S5, etc. have been included in the block LC1 in FIG. 3 although FIG. 1 illustrates the signals apart from the block L1 of which the relays of LC1 are a part.

The signals of this circuitry, inverted as described, would be displayed to aircraft traveling from right to left across the taxi-strip.

As illustrated in FIG. 3 relay FR1' controls contacts F11, F12, F13, F14 to close upon energization. Relay FR2' controls contacts F21 through F26 to close upon energization. Relay FR3' controls contacts F31 through F37 to close upon energization. Relay FR3'a controls contacts Fa1 to open upon energization and contacts Fa2 through Fa8 to close upon energization. FR3'b controls contact Fb2 to open upon energization and controls contacts Fb1 and Fb3 through Fb8 to close upon energization. Relay FR3'c controls contact Fc3 to open upon energization and contacts Fc1, Fc2 and Fc4 through Fc8 to close upon energization. Relay FR3'd controls contacts Fd4 to open upon energization and controls contacts Fd1, Fd2, Fd3, Fd5, Fd6 and Fd7 to close upon energization. Relay FR3' controls contact F45 to open upon energization and controls contacts F41, F42, F43, F44 and F46 to close upon energization. Relay FR5' controls contacts F51 to open upon energization and controls contacts F52, F53 and F54 to close upon energization and relay FT' controls contact FT1 to open upon energization and contact FT2 to close upon energization.

Closure of contact F11 or F21 cause energization of relay LG1 while closure of contact F12 or F22 or F31 cause energization of relay LR1, the relays LG1 and LR1 being associated with the lighting circuits of signal S5 in broken line box LC1.

With both relays LG1 and LR1 deenergized as illustrated an illuminating circuit from plus power through contacts LG12 and LR14, the lowermost position of switch S1 to the red (R) lamp of signal S5 to ground is completed. By positioning switch S1 to its middle position with relays LG1 and LR1 deenergized all the lamps of signal S5 will remain extinguished. By positioning switch S1 to its uppermost position as illustrated, the green (G) lamp of signal S5 will be illuminated.

Since LC1 controls the initial signal S5 of the left to right sequence and thereby controls initial entry into the taxi-strip the signal may rest in red, to prohibit entrance to the taxi-strip or rest in green or dark to permit entrance onto the taxi-strip. For this reason contact LR12 of relay LR1 is non-operative in the LC1 assembly.

With relays LG1 and LR1 energized as through closure of contacts F11 and F12 by energization of relay FR1' or through closure of contacts F21 and F22 by energization of relay FR2' lamp R will be illuminated from plus power through contacts LG11 and LR11 lamp R to ground.

With relay LR1 only energized as by energization of relay FR3' only, the yellow lamp (Y), will be illuminated for D.C. plus power through contacts LG12, LR13, lamp Y to ground.

Let it be assumed that the tracking system and apparatus includes nine detector stations DS1, DS2, DS3, DS3a, DS3b, DS3c, DS3d, DS4 and DS5 with two termination units T and T'.

The detector stations DS1, DS2, DS3, DS4 and DS5 would be as illustrated in FIGS. 2b, 2c, 2d, 2e and 2f respectively. The detector stations DS3a, DS3b, DS3c and DS3d would be interposed between detector stations DS3 and DS4 and would include circuitry and connections similar to DS3 as illustrated in FIG. 2d. The termination units T and T' would be as illustrated in FIGS. 2a and 2g respectively.

Let it also be assumed that the signal control circuits illustrated in FIG. 3 are associated with the assumed tracking system and apparatus so that the relays across the top of FIG. 3 are repeater relays for the relays in the termination units and relay assembly units similarly labeled without the prime mark.

Let it be further assumed that the switch S1 in block LC1 in FIG. 3 is in its uppermost position thus displaying a green (G) lamp on signal S5 to aircraft approaching and permitting entrance onto the taxi-strip from the left end.

As relay FR1 of detector station DS1 is energized, relay FR1', its repeater relay, is also energized.

Closure of contact F11 causes energization of relay LG1 and closure of contact F12 causes energization of relay LR1 causing lamp G to be extinguished and lamp R to be illuminated.

As previously stated, the light relays LGc and LRc in broken line box LC3c and the illuminating circuits, switches SWBc and SWc and associated signal S7c are typical of the relays, circuitry, switches and signal that may be included in the boxes LC2, LC3, LC3a, LC3b, LC3d and LC4.

Closure of contact F13 will complete a circuit to energized relay LG2 from plus power through contact F13, contact Fa1 to the coil of relay LG2 in block LC2 to ground and closure of contact F14 completes a circuit to energized relay LG3 in block LC3 from plus power through contact F14, contact Fb2, the coil of relay LG3 to ground. The relay coil circuits are shown in detail in the typical mid-section block LC3c.

As seen in the light control circuits fully illustrated in broken line block LC3c with relays LGc and LRc deenergized and switches SWBc and SWc as illustrated, only the red (R) lamp of the signal S7c is illuminated. This is the red rest condition of the interim signals. If it is desired to rest the interim signals normally dark the switch SWBc may be moved to its upper position.

With Relay LGc energized and relay LRc deenergized the lamp G of signal S7c is illuminated. With relays LGc and LRc both energized the lamp R of signal S7c is illuminated and with relay LGc deenergized and LRc energized the lamp Y is illuminated. With switch SWc in its lower position the caution yellow signal indication can be replaced with a red signal indication.

Thus with relay LG2 of block LC2 energized and relay LR2 of block LC2 deenergized the lamp G will be illuminated in signal S6 of block LC2. Also with relay LG3 of block LC3 energized and relay LR3 of block LC3 deenergized lamp G will be illuminated in signal S7 of block LC3.

Thus two green signal lamps in S6 and S7 will be illuminated forward of the aircraft while the signals ahead or farther up the taxi-strip from S6 and S7 will remain at red or dark rest and the signal behind the aircraft S5 will display a red stop signal to any aircraft traveling behind the aircraft in the taxi-strip.

With energization of relay FR2 and FR2' and deenergization of relays FR1 and FR1' relays LG1 and LR1 are held energized via contacts F21 and F22 respectively.

Closure of contact F23 maintains relay LG2 energized while closure of contact F24 energizes relay LR2 of block LC2. Thus energized relays LG2 and LR2 cause a red stop lamp to be illuminated in signal S6.

Closure of contact F25 maintains relay LG3 energized to hold lamp G illuminated in signal S7 while closure of contact F26 causes relay LGa of block LC3a to become energized while relay LRa of block LC3a remains deenergized thereby illuminating the lamp G in signal S7a.

Upon energization of relays FR3 and FR3' and deenergization of relays FR2 and FR2' relay LG1 is de-energized and relay LR1 is maintained energized by closure of contact F31 causing illumination of the yellow lamp in signal S5.

Closure of contacts F32 and F33 maintains relays LG2 and LR2 respectively energized, to hold the lamp R illuminated in signal S6 of block LC2.

Closure of contact F34 maintains relay LG3 energized while closure of contact F35 causes energization of relay LR3 of box LC3 thus causing illumination of lamp R in signal S7.

Closure of contact F36 maintains relay LGa energized while relay LRa remains deenergized and holds the lamp G of signal S7a illuminated.

Closure of contacts F37 supplies plus power through contacts F37 and Fd4 to relay LGb in block LC3b while relay LRb remains deenergized thus causing illumination of lamp G in signal S7b of box LC3b.

Upon energization of relay FR3a and FR3'a and deenergization of relay FR3 and FR3' contact Fa1 is opened to ensure deenergization of relay LG2. The opening of contact Fa1 provides an open circuit for maintaining relay LG2 deenergized in the event that relays FR1 and FR1' are energized by a following aircraft in the taxi-strip.

Closure of contact Fa2 holds relay LR2 energized thus providing for illumination of the Y lamp in signal S6 of block LC2.

Closure of contacts Fa3 and Fa4 maintain relays LG3 and LR3 energized and closure of contacts Fa5 and Fa6 maintain and cause energization of relays LGa and LRa respectively thus producing illumination of lamp R only in signal S7a.

Closure of contact Fa7 maintains relay LGb energized and closure of contact Fa8 causes energization of relay LGc thus maintaining illumination of lamp G in signals S7b and producing illumination of lamp G in S7c.

With relay LGc of broken line box LC3c energized and relay LRc deenergized contact LG31 is closed thus completing a circuit from plus power through contact LG31 through normally closed contact LR32, the lamp G to ground, thus providing illumination of lamp G in signal S7c.

Upon energization of relay FR3b and FR3'b and deenergization of relays FR3a and FR3'a contact Fb2 is opened to ensure deenergization of relay LG3 with closed contact Fb3 maintaining relay LR3 energized thus providing illumination of lamp Y in block LC3. Contacts Fb4 and Fb5 close and maintain relays LGa and LRa energized respectively.

Closure of contact Fb6 maintains relay LGb energized while closure of contact Fb7 causes energization of relay LRb resulting in illumination of lamp stop/red in signal S7b of block LC3b. Closure of contact Fb8 maintains relay LGc energized.

Closure of contact Fb1 causes energization of relay LGd through contacts F51, relay LGd, included in block LC3d, causing illumination of lamp G of signal S7d in block LC3d.

Upon energization of relays FR3c and FR3'c and deenergization of relays FR3b and FR3'b closure of contact Fc1 maintains relay LGd energized while closure of contact Fc2 completes a circuit to energized relay LG4 resulting in illumination of lamp G of signal S8 of block LC4.

The opening of contact Fc3 provides an open circuit to deenergize relay LGa while closure of contact Fc4 maintains relay LRa energized thus illuminating lamp Y of signal S7a.

Closure of contacts Fc5 and Fc6 maintain relays LGb and LRb energized while closure of contact Fc7 maintains relay LGc energized and closure of contact Fc8 results in energization of relay LRc.

With both relays LGc and LRc energized contacts LG31 and LR31 are closed to complete an illuminating circuit from plus power through contacts LG31 and LR31, lamp R to ground thereby illuminating lamp red stop in signal S7c of broken line box LC3c.

Upon energization of relays FR3d and FR3'd and deenergization of relays FR3c and FR3'c contact Fd1 is closed to maintain relay LGd energized and closure of contact Fd2 causes energization of relay LRd resulting in illumination of lamp red stop of signal S7d of block LC3a.

Closure of contact Fd3 maintains energization of relay LG4 of block LC4.

The opening of contact Fd4 causes deenergization of relay LGb of block LC3b while contact Fd5 maintains relays LRb energized resulting in illumination of lamp Y of signal S7b of block LC3b.

Closure of contacts Fd6 and Fd7 maintain relays LGc and LRc energized thus maintaining illumination of lamp red stop.

Upon energization of relays FR4 and FR4' and deenergization of relays FR3d and FR3'd closure of contacts F41 and F42 maintain relays LGd and LRd energized respectively. Closure of contact F43 maintains relays LG4 energized while closure of contact F44 results in energization of relay LR4 causing illumination of lamp red stop of signal S8 of block LC4.

The opening of contact F45 deenergized relay LGc while closure of contact F46 maintains relay LRc energized. Thus the lamp Y of signal S7c is illuminated from plus power through contacts LG32 and LR33, switch SWc, lamp Y to ground.

Upon energization of relay FR5 and FR5' and deenergization of relay FR4 and FR4' contact F51 is opened to break the energizing circuit for relay LGd while closure of contact F52 maintains relay LRd energized thereby providing illumination of the lamp Y of signal S7d of block LC3d.

Closure of contacts F53 and F54 maintain relays LG4 and LR4 energized.

Upon energization of relay FT and FT' and deenergization of relays FR5 and FR5' contact FT1 opens and causes deenergization of relay LG4 while closure of contact FT2 maintains relay LR4 energized providing illumination of lamp Y of signal S8 of block LC4.

Of course as the relays LG1 and LR1 return to a deenergized state the signal S5 returns to its rest condition here, illustrated resting in green. However, all subsequent signals upon deenergization of their associated light relays return to a red rest or dark rest condition.

It should be noted that as the aircraft proceeded along the taxi-strip, except for the exit end of the taxi-strip green lamps were illuminated in next two signals visibly forward of the aircraft while red lamps were illuminated in the two signals following or to the rear of the aircraft, the third signal to the rear being illuminated with a yellow signal. To the rear of the yellow signal, the signals reverted to a red or dark rest condition.

This series of illuminated signals progressed along the taxi-strip as the aircraft proceeded along the taxi-strip.

In this connection it may be desired to maintain one red illuminated signal followed by a yellow illuminated signal, behind the aircraft. FIG 4 illustrates signal control circuitry that provides two green illuminated signals visibly forward of the aircraft and a red and a yellow signal following the aircraft progressively along the taxi-strip.

Referring now to FIG. 4, an alternate form of signal control circuits is illustrated partly in block and partly in schematic circuit form. Across the top of the figure are seven blocks consecutively labeled FR1', FR2', FR3', FR3'a, FR3'b, FR4' and FR5'. These relays are repeater relays of relays FR1, FR2, FR3, FR4 and FR5 respectively of FIG. 2. The relays FR3'a and FR3'b represent repeater relays of the FR series of two interposed relay assemblies of two inserted detector stations here assumed to be inserted into the tracking system and apparatus between detector stations DS3 and DS4. The relays FR1', FR2' etc. may be connected in parallel with the relay it is repeating or may be energized through a circuit in which there is a source of current, a ground connection and a normally open contact that is closed upon energization of the relay that is repeated.

The said relays FR1', FR2', etc. are similar to the identically labeled relays in FIG. 3 and are similarly illustrated deenergized with their respective contacts arranged below the relay by which the contacts are controlled. The broken line box LC1 surrounds the light relays LG1 and LR1, lamp illuminating circuits, selector switch S1 and a set of signals S5, similar to that described in the box LC1 in FIG. 3. Included in the lamp illuminating circuit in the box LC1 in FIG. 4 is a selector switch SWA that may also be included in the circuits in the box LC1 in FIG. 3. As explained with reference to FIG. 3, the signals S5 in FIG. 4 may be associated with the detector station DS1 illustrated in FIG. 1.

The blocks LC2, LC3, LC3b and LC4 represent the combination of two light relays, the lamp illuminating circuits, selector switches and the signals, illustrated in circuit form in broken line box LC3a including the relays LGa, LRa, their respective contacts, the lamp illuminating circuits, the switches SWBa and SWa and the set of signals S7a.

As in FIG. 3, the block LC2 in FIG. 4 may include for example, two light relays LG2 and LR2, switches SW2 and SWB2, lamp illuminating circuits and a set of signals S6, the signals being associated with detector station DS2 in FIG. 1. Block LC3 may include, for example, two light relays LG3 and LR3, switches SW3 and SWB3, lamp illuminating circuits and a set of signals S7, the signals being associated with detector station DS3 in FIG. 1. Block LC3b may include, for example, two light relays LGb and LRb, switches SWb and SWBb, lamp illuminating circuits and a set of signals S7b. Block LC4 may include for example, two light relays LG4 and LR4, switches SW4 and SWB4 and a set of signals S8, associated with detector station DS4 in FIG. 1.

The signals S7a and S7b would be respectively interposed along the taxi-strip between signals S7 and S8 and associated with the interposed detector stations interposed between DS3 and DS4 in FIG. 1.

To prevent overcrowding of the drawing, one complete light relay assembly, in broken line box LC3a, is presented in detail circuit form, this light relay assembly being typical of other light relay assemblies that may be employed in the control system except for the light relay assembly LC1.

The signal control circuits and the associated light relays, the illuminating circuits and sets of signals of FIG. 4 may be employed, in association with the tracking system and apparatus for control of the signals particularly displayed to aircraft traveling from left to right, for example, along the taxi-strip.

To provide signal control circuits and associated light relays and signals for display to aircraft traveling from right to left, for example, the relay designations FR1', FR2', FR3' etc. would be changed so that reading from left to right the relays would be RR5', FF4', RR3'b, RR3'a, RR3', RR2' and RR1', then by reversing the relays and circuitry of FIG. 4 in mirror image, relay and circuitry may be obtained for control of aircraft traveling from right to left. The signals S5, S6, S7, S7a, S7b, and S8 would then become S15, S16, S17b, S17a, S17 and S18 respectively and the switch S1 would become S2.

The signals of this unit, inverted as described, would be displayed to aircraft traveling from right to left across the taxi-strip.

As presented, the relays FR1', FR2', etc. of FIG. 4 may be connected in parallel with the FR series relays of the relay assembly unit with which the relays FR1', FR2' etc. are respectively associated.

The broken line block LC1 of FIG. 4 includes the light control relays LG1 and LR1, switch S1 and signal S5 with lamps G, Y and R, all of which are similar to the components included in broken line block LC1 of FIG. 3 and are identically labeled. Included in broken line block LC1 in FIG. 4 is a switch SWA which could also be included in block LC1 in FIG. 3. The switch SWA, as illustrated, provides illumination of lamp Y when relay LG1 is deenergized and relay LR1 is energized. The lower position of switch SWA provides for illumination of lamp R with the same relay combination, thus eliminating illumination of the lamp Y in the light sequence of the signal S5, if desired.

It will be seen in comparing the light relay control circuits of FIG. 3 and FIG. 4 that the relay LG1 energizing circuit of FIG. 3 includes contacts F11, under relay FR1' and F21 under relay FR2' while the relay LG1 energizing circuit of FIG. 4 includes contact F11, under relay FR1' and does not extend to additional relay control.

Likewise relay LR1 energizing circuit of FIG. 3 includes contacts F12, F22 and F31 under relays FR1', FR2' and FR3' respectively while the relay LR1 energizing circuit of FIG. 4 includes contacts F12 and F22 under relays FR1' and FR2' respectively and does not extend to relay control by a third relay.

Thus it may be seen that the energizing circuits of relays LG1 and LR1 extend under a three relay control system in FIG. 3 and have a two relay control system in FIG. 4.

The relay LG2 of block LC2 in FIG. 3 has its energizing circuit extending under four relays, i.e. FR1', FR2', FR3' and FR3'a while relay LG2 in block LC2 in FIG. 4 has its energizing circuit extending under three relays, i.e. FR1', FR2' and FR3'.

The detail circuitry in broken line box LC3a in FIG. 4 is typical of the circuitry illustrated in block form by blocks LC2, LC3, LC3b and LC4.

It will be observed that the energizing circuits for the relay LGa in FIG. 4 in block LC3a, extend under four relays through contact F26, under relay FR2', contact F36 under FR3, contact Fa5 under relay FR3'a and contact Fb4 under relay FR3'b and the energizing circuits for the relay LRa extend under two relays, through contacts Fab under relay FR3'a and contact Fb5 under relay FR3'b.

It has been seen that the comparable relay energizing circuits in FIG. 3 extend for relay LGc under five relays, contact Fa8 under relay FR3'a, contact Fb8 under relay FR3'b, contact Fc7 under relay FR3'c, contact Fb6 under relay FR3'd and contact F45 under relay FR4' while the energizing circuits for relay LRc extend under three relays through contact Fc8 under relay FR3'c, contact Fd7 under relay FR3'd and contact F46 under relay FR4'.

Thus a shorter signal sequence is provided in the control circuits of FIG. 4 so that normally two green lamps will be displayed visually forward of the taxiing aircraft while one red lamp and one yellow lamp will be displayed in the signals behind the aircraft, excluding of course the signals that normally rest in red. This foreshortened series of signals provide shorter spacing between two aircraft, one traveling behind the other on the same taxi-strip.

FIG. 5 illustrates partly in block and partly in schematic form an alarm circuit that may be used in association with the tracking system or apparatus to indicate, by alarm, as illustrated, or other manner, when two aircraft are proceeding in opposite direction along the same taxi-strip.

On the top of the figure is a group of ten relays, in block form, isolated in groups of two by broken line boxes marked R1, R2, R3, R4 and R5. Each broken line box represents, in block form, a relay assembly unit of similar designation illustrated in full schematic circuit form in FIG. 2. Each relay, RR1 and FR1, for example, represents a similarly labeled relay in the full circuit diagram in FIG. 2.

The contacts C10, C20, C30, C40 and C50 under relays RR1, RR2, RR3, RR4 and RR5 respectively may be added to the contacts controlled by the respective relays of the relay assembly unit with which the respective relays are associated. Each of these normally open contacts are connected in parallel between ground and a relay AF, the other side of the relay being connected to D.C. power. Relay AF controls normally open contact AF1.

Contacts C11, C21, C31, C41 and C51 under relays FR1, FR2, FR3, FR4 and FR5 respectively may be added to the contacts controlled by the respective relay. Each of these normally open contacts are connected in parallel between ground and a relay AR, the other side of the relay being connected to D.C. power. Relay AR controls normally open contact AR1.

An alarm circuit including a power supply BT, an alarm AL, contact AR1, contact AF1, and switch ASW are all in series connection.

In the description of the normal operation of the tracking system and apparatus it was explained that the successive relays FR1, FR2, etc. were energized by passage of an aircraft from left to right along the taxi-strip and that the successive relays RR5, RR4, etc. were energized by passage of an aircraft from right to left along the taxi-strip.

Thus if two aircraft were traveling in opposite directions along the same taxi-strip, one of the relays of the FR series would be energized as one aircraft proceeds from left to right, as for example FR1, and one of the relays of the RR series would be energized as the other of the aircraft proceeds along the taxi-strip from right to left, as for example, RR5.

Energization of relay FR1 would close its contacts including contact C11 which would complete an energizing circuit for relay AR from ground through contact C11, the coil of relay AR to D.C. supply. Energized relay AR would close its contact AR1.

Energization of relay RR5 would close its contacts including contact C50 which would complete an energizing circuit for relay AF from ground through contact C50, the coil of relay AF to D.C. supply. Energized relay AF would close its contact AF1. With switch ASW closed, as illustrated, closure of contacts AF1 and AR1 would complete an alarm circuit from the negative side of the power supply BT, through switch ASW, contact AF1, contact AR1, through alarm A1 to the positive side of the power supply BT, thus operating the alarm AL.

The switch ASW is provided so that the alarm circuit may be opened by opening switch ASW even though the series connected contacts AR1 and AF1 are closed.

FIG. 6 represents, in block form a relay assembly unit R and the associated section of the signal control circuit, L, in a block RL.

The upper section, R, of block RL includes smaller blocks RR, DR, ER, TR and FR which individual blocks represent relays and their respective contacts arranged below the relay. The individual relays and their respective contacts are illustrated in circuit form in FIGS. 2b through 2f inclusive with the relay designations including the number of the section in the series, as for example, RR1, DR1, ER1, TR1 and FR1.

The lower section L of block RL includes smaller blocks RR', FR', LG', LR', LG and LR. A broken line joining block RR with block RR' and joining block FR with block FR' represents that the two joined relays work in association such that relay RR' is a repeater relay of relay RR and that relay FR' is a repeater relay of relay FR. The blocks in section L of block RL represent relays and their respective contacts.

The relays and their contacts are more fully described in FIG. 3 and FIG. 4.

The sections R1, R2, R3, R4 and R5 of FIG. 1 would include relays similar to those presented in section R in FIG. 6 while sections L2, L3, and L4 in FIG. 1 would include relays similar to those presented in section L in FIG. 6. Section L1 in FIG. 1 would include relays RR', FR' and light relays LG and LR in section L in FIG. 6 while section L5 of FIG. 1 would include relays RR', FR' and light relay LG' and LR' of FIG. 6.

As previously explained, the signal S19 that would normally be controlled by relays LR' and LG' is illustrated as the last signal in a right to left series and is controlled by manual operation thus the relays LR' and LG' in L1 would be deleted. Correspondingly, signal S9 that would normally be controlled by L5 by relays LR and LG is illustrated as the last signal in a left to right series and is controlled by manual operation thus the relays LR and LG in L5 would be deleted.

FIG. 6 is presented to illustrate the relationship between the relay assembly units and the associated part of the signal control circuit which may be employed together. The signals of the signal control circuit illustrated in FIG. 1, FIG. 3 and FIG. 4 are not illustrated in FIG. 6 to avoid overcrowding of the drawing but such signals would be associated with the light relays LG and LR for control of left to right traffic and LG' and LR' for control of right to left traffic.

FIG. 7 illustrates, in block form, the several drawings of FIG. 2, including FIG. 2a through FIG. 2g and shows how the several figures may be fitted together, one next to the other to illustrate a complete circuit drawing of the tracking system and apparatus where the present invention includes two termination units and five detector stations.

The specification and drawings above described disclose an actuated tracking system or apparatus for use at an airport.

It is obvious that should the radio beam of the detector be directed vertically upward so that passage of an aircraft in flight may actuate the detector, similar response by the detector station as that previously described for actuation on a horizontal plane would result.

Therefore by placing the detectors on the ground, in the aproach and climb corridors of the airport, and directing the radio beam upward for actuation by airborne aircraft, passage through the radio beam would result in tracking incoming, or outgoing aircraft in flight as well as on the ground.

Thus with detectors spaced some distance away from the runway, as for example, at the end of the runway, at one half mile from the end of the runway and at a point one mile from the runway, for example, as illustrated in FIG. 1a an incoming aircraft may be detected and tracked as it approaches the airport for landing and also as it proceeds along the ground.

Likewise, aircraft leaving or taking off, may be tracked as the aircraft proceeds down the runway while still on ground and may also be tracked on its take-off leg from the airport while in the air for some distance from the end of the runway.

Thus a system or apparatus for tracking an aircraft in flight, in the approach and climb corridors of an airport and while on the ground at the airport through actuation of the aircraft itself, has been described, with remote indication of aircraft activity clearly indicated via specific combinations of indicator lamps and alarms and a signal control system, responsive to actuation, for association with the tracking system or apparatus has been described thereby completing the several objectives previously stated.

It will be noted that several detection stations having the circuitry of FIG. 2d may be connected together side by side to comprise a series of detection stations, and thus a series of detection stations may be considered, a series of intermediate stations in general or an entire series including intermediate stations and those stations at or adjacent the ends together with associated terminating units.

It will be noted that the sequence of actuation of adjacent detection stations, or of nearby detection stations spaced by one intervening detection station, is employed in general to determine indication of aircraft position and direction, and thus the normal entry end station and the normal exit end station of an entire series are in a sense special cases or partial exceptions to the general rule, as are also to a lesser extent the second and next to last detection stations.

For convenience of reference "illegal entry" or "unsequential entry" shall mean entrance of an aircraft onto the taxi-strip or runway, other than at the beginning of the taxi-strip or runway in the preferred direction.

With the tracking system or apparatus adjusted for a preferred direction, the indication of illegal entry, the combination of three lamps illuminated (for example L30, L31 and L32) plus an alarm (for example A30) operated, may occur at any one detector station position on the panel except the first and the second detector station position as illustrated. If an aircraft makes "illegal entry" between the first and the second detector station of the preferred direction and actuates the second detector station without prior actuation of the first detector station, the indicator lamps, at the position of the first detector station will indicate a combination to show that the first detector station has been "skipped" (illumination of bar lamp L11, for example), while the second detector station will indicate normal travel indication in the preferred direction. If actuation of the second of the series of detector stations, in the preferred direction, is made followed by actuation of the first of the series of detector stations in the preferred direction, the "skipped" combination at the first detector station position will develop into an "illegal entry" combination indication at the first detector station position.

"Illegal entry" indication combination will also be provided at the position of the last detector station of the series in the preferred direction when entry is made against the preferred direction at the last detector station, or entry is made between the last and next to last detector station in the series and actuation of the last detector station alone is made.

Switches 91 and 92 are provided in the terminating units in FIGS. 2a and 2g respectively. These switches adjusted as illustrated, do not affect the operation of the system as above described. However, they may be manually operated to their lower position so that switch 91 will shunt contact 89 and switch 92 will shunt contact 88 to render the control of the ER relay in the second and next to last stations, DS2 and DS4, independent of these contacts of the direction selecting relays FP and RP.

With the alternate positioning of the switches 91 and 92 to shunt the contacts as described, the illegal entry indication appears in the second detector station position in the preferred direction when the first detector station is not actuated prior to actuation of the second detector station. Thus in such condition the skip indication in the first detector station will be eliminated since both relays RR and FR are operated in the second detector station and one of these relays will open the series operating circuit for the ER relay of the first detector station.

While a preferred embodiment of the present invention has been set forth and a number of alternate arrangements described, it will be appreciated by those skilled in the art that various other modifications, substitutions and rearrangement of parts might be made without departing from the spirit of the invention within the scope of the claims.

I claim:

1. A system for centralized tracking of aircraft along a predetermined path and including a display panel, a series of aircraft detection stations along said path, indicators on said panel individual to the respective said detection stations, and an interlocking relay system for progressively operating and releasing the indicators in sequence in response to detection of aircraft by the respective detection stations of said series progressively, in which said interlocking relay system includes means individual to any one detection station interlocked with corresponding means individual to a preceding detection station of said series for so operating said indicator associated with said one detection station in cooperation with said corresponding means individual to said preceding detection station to indicate the position of said aircraft with respect to each of the said detection stations in proceeding along said path.

2. A system for centralized tracking of aircraft along a predetermined path and including a display panel, a series of aircraft detection stations along said path, a forward indicator and a reverse indicator on said panel for the two opposite directions along said path and individual to the respective detector stations, and an interlocking relay system including means individual to each said respective detection station interlocked with corresponding means of a preceding said detection station for operating and locking and releasing the forward indicators progressively in sequence in response to cooperation between said interlocked means of detection stations of said series and sequential actuation by aircraft of the detection stations progressively in the forward direction and means for operating and locking and releasing the reverse indicators progressively in sequence in response to cooperation between said interlocked means of detection stations of said series and sequential actuation by aircraft of the detection stations progressively in the reverse direction, whereby the position and direction of progress of said aircraft along said path will be automatically indicated on said panel.

3. A system for centralized tracking of aircraft as in claim 2 and including means for selectively presetting said relay system for preferred direction of entry of aircraft at either end of said series of stations and alarm means for indicating entry of aircraft contrary to said preferred direction.

4. A system for centralized tracking of aircraft as in claim 2 and said relay system including locking relay means for so operating the associated said indicator for one direction for any one station of said series in response to actuation by aircraft at said one station when the corresponding locking relay means is so operating the corresponding indicator for said one direction for the next preceding station of said series in said one direction and means for releasing said operated locking relay means for said one station for so releasing said operated indicator for said one direction for said one station when the further corresponding locking relay means is so operating the further corresponding indicator for said one direction for the next succeeding station of said series in response to actuation and termination of such actuation by aircraft passing said next succeeding station.

5. A system for centralized tracking of aircraft as in claim 2, and said relay system including locking relay means for so operating the indicator for one direction for any one station of said series in response to actuation by aircraft of said one station when the corresponding locking relay means for either of the next two preceding stations is so operating its associated corresponding indicator for said one direction and means for so releasing said operated locking relay means for said one station when either of the corresponding locking relay means for so operating the said associated corresponding indicator for said one direction is operated in response to actuation and termination of such actuation by aircraft passing either of the two next succeeding stations in said one direction.

6. A system for centralized tracking of aircraft as in claim 2 and including a further indicator for each of certain of said detection stations of said series and means for operating said further indicator for any one said certain detection station in response to aircraft actuation of said one detection station in absence of next prior such actuation of either of the next two adjacent detection stations in either direction in said series.

7. A system for centralized tracking of aircraft as in claim 2 and including another indicator for each of certain of said detection stations of said series and means for operating said other indicator for any one said certain detection station in response to a sequence of aircraft actuation of two of said detection stations separated by said one station as an intervening station in said series without such actuation of said one intervening station.

8. A system for centralized tracking of aircraft as in claim 2 and including a further indicator for each of certain of said detection stations of said series and means for operating said further indicator together with both said forward indicator and said reverse indicator for said one detection station in response to aircraft actuation of said one detection station in absence of next prior such actuation of either of the two next adjacent detection stations in either direction in said series.

9. A system for centralized tracking of aircraft as in claim 1 and in which said indicators are adapted to indicate direction along said series of detection stations and said relay system includes relay means for each detection station for operating and holding operated said indicator for the latest actuated detection station and to so indicate the direction of progress of the aircraft in response to sequence of actuation of two successive stations, and means controlled by said relay means and by actuation at said latest actuated detection station to release the corresponding relay means for the preceding detection station to discontinue operation of the corresponding direction indicator of said preceding detection station.

10. A system for centralized tracking of aircraft as in claim 1 and in which said indicators are adapted to indicate direction along said series of detection stations and said relay system includes relay means for each detection station for operating and holding operated said indicator for the latest actuated detection station and to so indicate the direction of progress of the aircraft in response to sequence of actuation of two successive stations, and means controlled by said relay means and by actuation and termination of such actuation at said latest actuated detection station to release the corresponding relay means for the preceding detection station to discontinue operation of the corresponding direction indicator of said preceding detection station, additional indicator means, and means for operating said additional indicator means for the said latest actuated detection station in response to reactuation of the same said latest detection station while the first mentioned indicator is so operated.

11. A system for centralized tracking of aircraft as in claim 2, and including an alarm and means for operating said alarm when said means for operating any of the forward indicators and said means for operating any of the reverse indicators are concurrently operated, whereby said alarm will be operated in response to aircraft proceeding in opposite directions concurrently in the same path.

12. A system for centralized tracking of aircraft along a predetermined path comprising a runway and accompanying landing approach corridor at an airport, including a display panel, a series of aircraft detection stations along said path each having a detector having a beam of radiant energy fanning across said path and adapted to provide an output in response to aircraft passing through said beam on and somewhat above the ground in the area substantially directly adjacent to said detector and including at least one such detector in the approach corridor and spaced a substantial distance from and extending generally in line with the runway and having its beam fanning upward across but substantially limited to said approach corridor, substantially directly adjacent to said detector, said series of detection stations serving to divide said path into a series of sections starting with one said detection station in the approach corridor and extending along the runway, indicators on said panel individual to the respective said detection stations, and an interlocking relay system including means individual to the said respective detection station interlocked with corresponding said means of other detection stations of said series for operating and releasing the indicators progressively in response to progressive outputs from detection of aircraft in sequence by said detection stations of said series.

13. A system for centralized tracking of aircraft as in claim 12 and in which said detectors are of the Doppler radar type.

14. A system of tracking aircraft as in claim 1 and including signals adjacent the respective detection stations along said path, and means controlled by said interlocking relay system for operating said signals to establish a minimum desired spacing between successive aircraft proceeding along said path by said detection stations.

15. A system of tracking aircraft as in claim 1 and including signals adjacent the respective detection stations along said path, and means controlled by said interlocking relay system for operating said signals to maintain a minimum spacing of aircraft along said path exceeding the spacing of said detection stations.

16. A system of tracking aircraft as in claim 1 and including signals adjacent the respective detection stations along said path, and means controlled by said interlocking relay system for operating said signals to maintain a minimum spacing of aircraft along said path exceeding the spacing of detection stations separated by one intervening said detection station.

17. An aircraft indicating and signal system for taxiways and the like at an airport including a display panel, a series of aircraft detection stations along said taxiway, indicators on said panel individual to said detection stations and arranged on said panel to correspond generally with the arrangement of said detection stations along said taxiway, an interlocking relay system for operating and releasing said indicators progressively in response to sequential actuation of successive detection stations of said series and including means for holding operated the indicator for the latest actuated of said detection stations until released by passage of the aircraft by a succeeding detection station, and means including signals adjacent the respective detection stations and controlled by said interlocking relay system for progressively providing a stop indication at the latest actuated detection station and at the next preceding detection station.

18. An aircraft indicating and signal system as in claim 17 and including means for operating said signals for additionally maintaining a stop indication at the detection station next preceding the first mentioned next preceding station in said series.

19. An aircraft indicating and signal system as in claim 18, and including further signals adjacent said respective detection stations and means for normally operating said further signals to provide an indication to permit aircraft to proceed for the two detection stations next succeeding the latest actuated of said series of stations actuated in sequence by one aircraft provided the stop signals for said two succeeding stations are not so provided by actuation by another aircraft immediately ahead of said one aircraft.

References Cited in the file of this patent
UNITED STATES PATENTS

| | | |
|---|---|---|
| 1,360,150 | Shannon | Nov. 23, 1920 |
| 2,391,991 | Mackey | Jan. 1, 1946 |
| 2,488,815 | Hailes | Nov. 22, 1949 |
| 2,963,700 | Pederzani | Dec. 6, 1960 |